United States Patent [19]

Nakagoshi et al.

[11] Patent Number: 5,377,333

[45] Date of Patent: Dec. 27, 1994

[54] PARALLEL PROCESSOR SYSTEM HAVING COMPUTING CLUSTERS AND AUXILIARY CLUSTERS CONNECTED WITH NETWORK OF PARTIAL NETWORKS AND EXCHANGERS

[75] Inventors: Junji Nakagoshi; Naoki Hamanaka, both of Tokyo; Hiroyuki Chiba, Koyasu; Tatsuo Higuchi, Fuchu; Shinichi Shutoh, Kokubunji; Yasuhiro Ogata, Akishima; Shigeo Takeuchi, Hannou; Tatsuru Toba, Kunitachi, all of Japan

[73] Assignees: Hitachi, Ltd.; Hitachi VLSI Engineering Corp., both of Tokyo, Japan

[21] Appl. No.: 945,483

[22] Filed: Sep. 15, 1992

[30] Foreign Application Priority Data

Sep. 20, 1991 [JP] Japan .................. 3-241092

[51] Int. Cl.$^5$ .................. G06F 13/00
[52] U.S. Cl. .................. 395/325; 395/800; 364/229; 364/231.9; 364/238.2; 364/DIG. 1; 370/58.1; 370/60.1; 370/85.1; 340/825.79; 340/825.85; 340/825.86; 340/825.89
[58] Field of Search .................. 395/800, 325, 200; 340/825.79, 825.85, 825.86, 825.89; 370/58.1, 60.1, 85.1

[56] References Cited

U.S. PATENT DOCUMENTS

| | | | |
|---|---|---|---|
| 3,594,728 | 7/1971 | Lytollis et al. | 340/825.94 |
| 3,617,823 | 11/1971 | Hofstein | 257/291 |
| 3,621,147 | 11/1971 | Perucca | 340/825.79 |
| 4,065,808 | 12/1977 | Schomberg et al. | 395/325 |
| 4,364,044 | 12/1982 | Kusano | 340/825.85 |
| 4,710,868 | 12/1987 | Cocke et al. | 395/325 |
| 4,837,739 | 6/1989 | McGill et al. | 395/325 |
| 4,918,686 | 4/1990 | Hayashi et al. | 370/60 |
| 4,973,956 | 11/1990 | Lin et al. | 340/825.86 |
| 5,058,001 | 10/1991 | Li | 395/500 |
| 5,070,446 | 12/1991 | Salem | 395/500 |
| 5,072,217 | 12/1991 | Georgion et al. | 340/825.79 |
| 5,113,390 | 5/1992 | Hayashi et al. | 370/65 |

FOREIGN PATENT DOCUMENTS

63-124162 5/1988 Japan .
1-131950 5/1989 Japan .

OTHER PUBLICATIONS

"Everything About 32-bit Microprocessors: Corporate Strategies, Technology, Market Trends" published by Nikkei McGraw-Hill, Dec. 1986, pp. 236–238.
C. Chin, "A Massively Parallel Processing System Based on a Hyper-Crossbar Network", the Second Symposium on the Frontiers of Massively Parallel Computation, Oct. 10–12 1988, pp. 463–466.
N. Tanake et al, "Hardware of Prodigy Parallel AI Machine", Institute of Electronics, Information and Communications Engineers, CPSY 89-45, Mar. 1989, pp. 39–44.
Dharma P. Agrawal et al, "Evaluating the Performance of Multicomputer Configurations", IEEE Computers, vol. 19, No. 5, May 1986, pp. 23–37.
Tse-Yun Feng, "A Survey of Interconnection Networks", IEEE Computers, vol. 14, No. 12, Dec. 1981, pp. 12–27.

Primary Examiner—Alyssa H. Bowler
Assistant Examiner—Meng-Ai T. An
Attorney, Agent, or Firm—Fay, Sharpe, Beall, Fagan, Minnich & McKee

[57] ABSTRACT

Crossbar switches having $2^n + 1$ ports and computing clusters are arranged so that each crossbar switch is connected to $2^n$ processors. Auxiliary processors that perform parallel processing administrative functions and input/output functions are arranged at the remainder ports of the crossbar switches. Exchangers are provided to connect each processor and its crossbar switches. Parallel processing may be executed by the $2^n$ processors independently of processing by the auxiliary processors for speed. One mounting unit is formed of a crossbar switch of one dimension, the processor group connected to that crossbar switch, and all of the crossbar switches of a different dimension that are connected to one of the processors of the one processor group. The parallel processor system is mounted by just combining mounting units with no need for special LSIs or frames or the like on which to mount the crossbar switches and without the interfaces that connect the processor and the network becoming concentrated in one place.

21 Claims, 18 Drawing Sheets

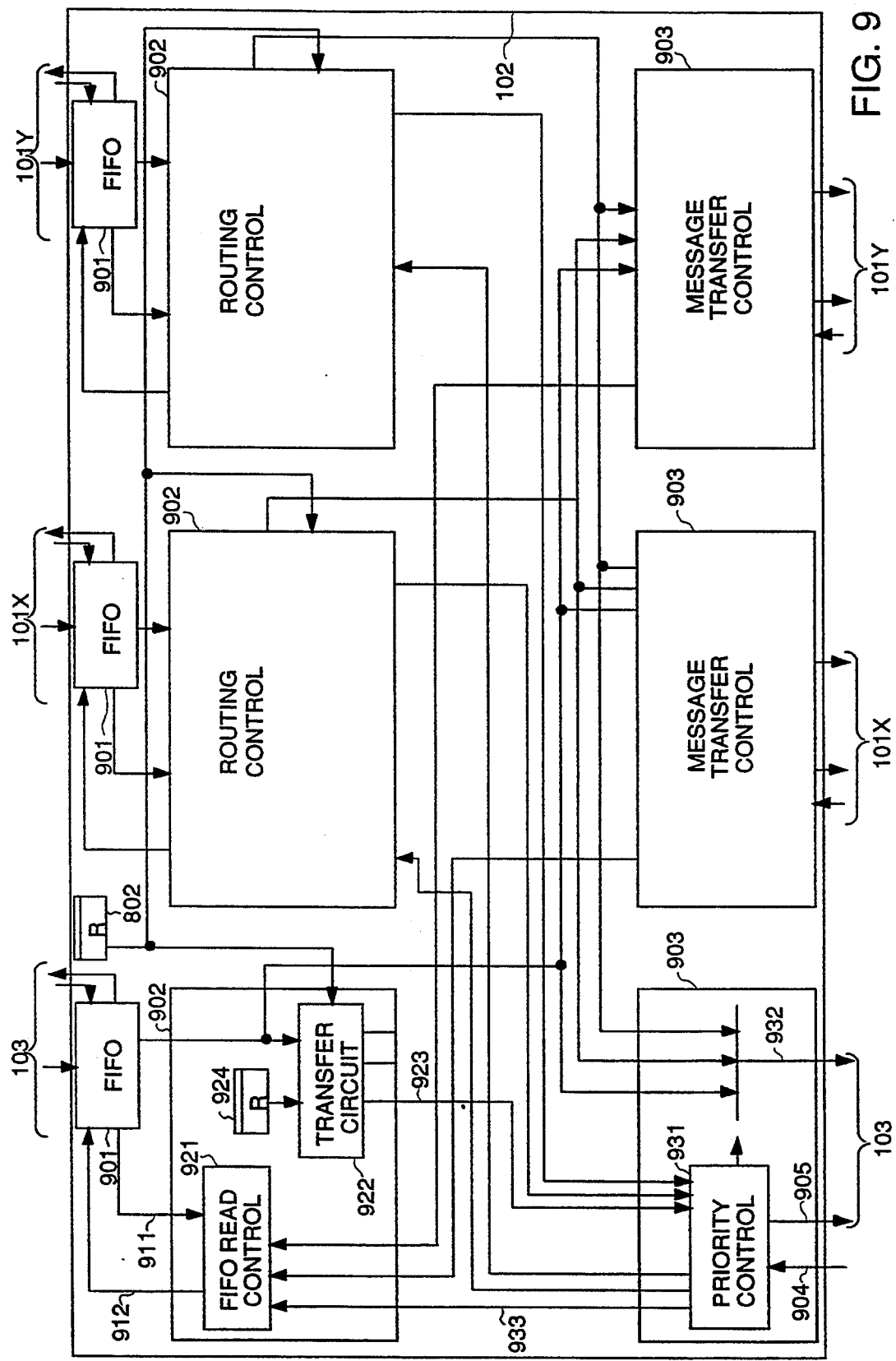

FIG 10

| RESULT OF COMPARISON OF RECEIVING CLUSTER NUMBER | | MESSAGE TRANSFER SEQUENCE CONTROL | |
| --- | --- | --- | --- |
| X SYSTEM | Y SYSTEM | 0 TRANSFER FROM X SYSTEM CROSSBAR | 1 TRANSFER FROM Y SYSTEM CROSSBAR |
| 0 (UNMATCH) | 0 (UNMATCH) | TRANSFER TO X SYSTEM CROSSBAR | TRANSFER TO Y SYSTEM CROSSBAR |
| 0 | 1 (MATCH) | SAME AS ABOVE | SAME AS ABOVE |
| 1 (MATCH) | 0 | TRANSFER TO Y SYSTEM CROSSBAR | TRANSFER TO X SYSTEM CROSSBAR |
| 1 | 1 | TRANSFER TO CLUSTER | TRANSFER TO CLUSTER |

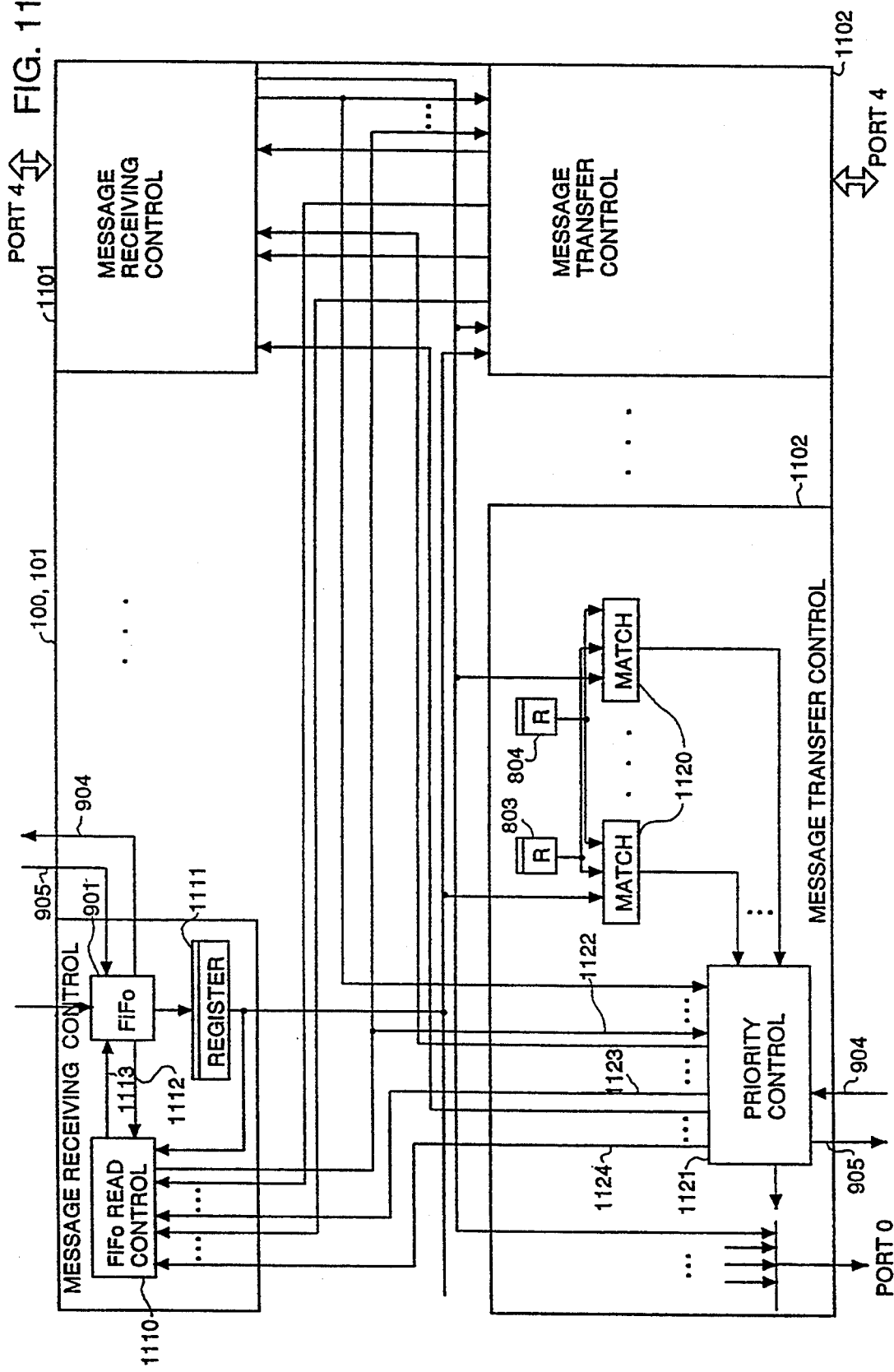

FIG. 12

| INPUT CLUSTER NUMBER | | OUTPUT | |
|---|---|---|---|
| CLUSTER | BIT PATTERN | X | Y |
| P00 | 00000 | 000 | 000 |
| P10 | 00001 | 001 | 000 |
| P20 | 00010 | 010 | 000 |
| P30 | 00011 | 011 | 000 |
| P01 | 00100 | 000 | 001 |
| P11 | 00101 | 001 | 001 |
| P21 | 00110 | 010 | 001 |
| P31 | 00111 | 011 | 001 |
| P02 | 01000 | 000 | 010 |
| P12 | 01001 | 001 | 010 |
| P22 | 01010 | 010 | 010 |
| P32 | 01011 | 011 | 010 |
| P03 | 01100 | 000 | 011 |
| P13 | 01101 | 001 | 011 |
| P23 | 01110 | 010 | 011 |
| P33 | 01111 | 011 | 011 |
| IOP0 | 10000 | 100 | 000 |
| IOP1 | 10001 | 100 | 001 |
| FEP | 10010 | 100 | 100 |
| ES0 | 10011 | 100 | 010 |
| ES1 | 10100 | 100 | 011 |

| INPUT | OUTPUT | |
|---|---|---|
| | X | Y |
| 0000 | 4 | 2 |
| 0001 | 4 | 3 |

LOCK REQUEST

| RECEIVING (EXTENDED STORAGE) CLUSTER NUMBER | TRANSFER CONTROL | LOCK REQUEST | TRANS- MITTING CLUSTER NUMBER | EXTENDED STORAGE ADDRESS | COMPAR- ISON DATA | STORAGE DATA |
|---|---|---|---|---|---|---|

FIG. 15A

LOCK RESPONSE

| RECEIVING CLUSTER NUMBER | TRANSFER CONTROL | LOCK RESPONSE | CONDITION CODE |
|---|---|---|---|

FIG. 15B

UNLOCK RESPONSE

| RECEIVING (EXTENDED STORAGE) CLUSTER NUMBER | TRANSFER CONTROL | UNLOCK REQUEST | EXTENDED STORAGE ADDRESS | STORAGE DATA |
|---|---|---|---|---|

READ REQUEST

| RECEIVING (EXTENDED STORAGE) CLUSTER NUMBER | TRANSFER CONTROL | READ REQUEST | TRANS- MITTING CLUSTER NUMBER | EXTENDED STORAGE ADDRESS | READ DATA STORAGE ADDRESS | READ DATA LENGTH |

FIG. 15E

READ RESPONSE

| RECEIVING CLUSTER NUMBER | TRANSFER CONTROL | READ RESPONSE | READ DATA STORAGE ADDRESS | READ DATA LENGTH | READ DATA |

FIG. 15F

WRITE REQUEST

| RECEIVING (EXTENDED STORAGE) CLUSTER NUMBER | TRANSFER CONTROL | WRITE REQUEST | EXTENDED STORAGE ADDRESS | WRITE DATA STORAGE ADDRESS | WRITE DATA LENGTH |

PARALLEL PROCESSOR SYSTEM HAVING COMPUTING CLUSTERS AND AUXILIARY CLUSTERS CONNECTED WITH NETWORK OF PARTIAL NETWORKS AND EXCHANGERS

BACKGROUND OF THE INVENTION

This invention relates to linking parallel processors in a parallel processor system, and more particularly to a parallel processor configuration and mounting ideally suitable for high speed parallel processing.

JP-B-63-124162 (hereinafter referred to as the first prior art example) is an example of a conventional parallel processor system configuration constituted by a plurality of parallel processors that each execute a parallel processing program (hereinafter referred to as the computing clusters) and a network that enables data to be transferred between computing clusters. In this parallel processor system, the computing clusters are arranged in a two-dimensional array consisting of $2^m$ rows vertically and $2^n$ columns horizontally (where m and n are positive integers), and each of the rows (X direction) and columns (Y direction) of the array is provided with a crossbar switch. Each of the computing clusters is connected to an X direction crossbar switch and a Y direction crossbar switch. To provide the connections with the X direction crossbar switch and the Y direction crossbar switch, each of the computing clusters has two input/output ports (hereinafter referred to simply as ports). In the following, this network of crossbar switches provided in each dimension is referred to as a partial crossbar network.

In NCUBE's (hereinafter referred to as the second prior art example), on the other hand, input/output processors (auxiliary processors) are linked together in a hypercube network configuration (see for example, pages 236 and 238 of "Everything About 32-bit Microprocessors: Corporate Strategies, Technology, Market Trends," published by Nikkei McGraw-Hill, December 1986). To realize this, each node processor has a number of ports equal to the number of hypercube dimensions plus one. The number of ports equal to the number of hypercube dimensions are connected to each of the other node processors, and the remaining port is connected to the input/output processor. That is, each node processor uses a dedicated port to provide a connection with an auxiliary processor.

Mounting of parallel processors in a partial crossbar network has been described in the prior art in, for example, C. Chin, "A Massively Parallel Processing System Based on a Hyper-Crossbar Network", the Second Symposium on the Frontiers of Massively Parallel Computation, Oct. 10-12 1988, pp. 463-466, and in Nobour Tanake et al, "Hardware of Prodigy Parallel AI Machine", the research report of the Institute of Electronics, Information and Communications Engineers, CPSY 89-45 to 58, March 1989, pp. 39-44, in Japanese (hereinafter referred to as the third and fourth prior art examples, respectively).

In the third prior art example, the parallel processor system is configured as a two-dimensional partial crossbar network. One crossbar switch, referred to as a local crossbar network, and the processor group connected thereto are mounted on one wafer. The other crossbar switch, referred to as a global crossbar network, is mounted on its own separate LSI. The parallel processor system is configured by combining a plurality of these wafers and LSIs.

In the fourth prior art example, the parallel processor system is configured as a three-dimensional partial crossbar network. A group of X direction and Y direction crossbar switches corresponding to one plane and the processor group connected thereto are mounted on one frame. A group of Z direction crossbar switches is mounted on its own frame. The parallel processor system is configured by combining a plurality of these frames.

Of general interest are: Dharma P. Agrawal, et al, "Evaluating the Performance of Multicomputer Configurations", IEEE Computers, Vol. 19, No. 5, May 1986, pages 23–37; and Tse-yun Feng, "A Survey of Interconnection Networks", IEEE Computers, Vol. 14, No. 12, December 1981, pages 12–27.

SUMMARY

It is an object of the present invention to analyze the prior art to determine problems to be solved.

The example of the first prior art in which each of the computing clusters is coupled to crossbar switches in the X direction and Y direction discloses only the processor coupling system. Although distribution of processing tasks among the processor groups, other such administrative functions and input/output functions are an essential part of parallel processing, there is no mention of the auxiliary processors that perform these functions. It also does not show a network for connecting such auxiliary processors with the processor group.

The example of the second prior art in which the computing clusters are each directly connected to the auxiliary processors, each computing cluster has to be provided with a new port. Moreover, there is no way to prevent the message transfer control circuitry of the new port from becoming complex. Furthermore, in accordance with this prior art a separate network is provided to connect the auxiliary processors with the computing clusters, but this separate network means that increasing the number of computing cluster units unavoidably produces a corresponding increase in complexity.

With respect also to the mounting of the parallel processors according to the third and fourth prior art examples, a dedicated LSI, frame or the like is needed to mount the crossbar switches separately from the processors. With such an arrangement, the interfaces for linking the processors with the crossbar switches become concentrated in one location, and there is a large number of interfaces. In some cases, this can mean that interfaces cannot be connected owing to a lack of sufficient pins on the special LSI or frame or the like on which the crossbar switches are mounted.

An object of the invention is to provide a parallel processor system that has a network with a relatively simple structure for connecting auxiliary processors with computing clusters.

An object of the invention is to provide a parallel processor mounting that does not concentrate in one place the interfaces used to connect the processors and the network.

To achieve the first object mentioned above, in accordance with this invention, auxiliary processors that perform parallel processing administrative functions and input/output functions are connected to partial crossbar networks that transfer data between any of the computing clusters. The crossbar switches of each dimension are partial crossbar switches that have $2^n$ ports plus one ($2^n+1$). The computing cluster group is arranged to form an n-dimensional network in which each dimension has $2^n$ computing clusters, the crossbar switches thereof are connected via exchangers. Auxiliary processors that perform parallel processing administrative functions and input/output functions are connected to one of the remaining ports of a crossbar switch via an exchanger.

To achieve the second object mentioned above, in accordance with this invention, one mounting unit is comprised of one crossbar switch of one dimension, the group of computing clusters connected to that crossbar switch, and all of the crossbar switches of a different dimension to the one mentioned above that are connected to one of the processors of the computing cluster group.

As in the prior art, parallel processing can be carried out by a computing cluster group configured as an n-dimensional network in which each dimension has $2^n$ computing clusters. For data transfer between processors, in the present invention, the computing clusters that perform the parallel processing are able to communicate with auxiliary processors. Each of the computing clusters does not have an additional port for an auxiliary processor, and the network link for the auxiliary processors provides only a very slight addition. As a result the scale of the parallel processor mounting can be decreased.

The parallel processor system can be formed by just combining mounting units so there is no need to use a special LSI or frame or the like on which to mount the crossbar switches. This enables the mounting to be done without processor and network connecting interfaces becoming concentrated in one place.

BRIEF DESCRIPTION OF THE DRAWINGS

Further objects, features and advantages of the present invention will become more clear from the following detailed description of a preferred embodiment, shown in the drawing wherein:

FIG. 9 is a schematic block diagram of an exchanger used in FIG. 1;

FIG. 10 is a diagram showing the transfer destination determination control used in FIG. 1;

FIG. 11 is a schematic block diagram of the crossbar switch used in FIG. 1;

FIG. 12 is a diagram showing the computing cluster conversion used in FIG. 1;

FIGS. 15A, 15B, 15C, 15D, 15E and 15F are diagrams of the extended storage access message format/according to this invention;

DETAILED DESCRIPTION OF THE PREFERRED EMBODIMENT

An embodiment of the invention will now be described with reference to the drawings.

Figure 1:
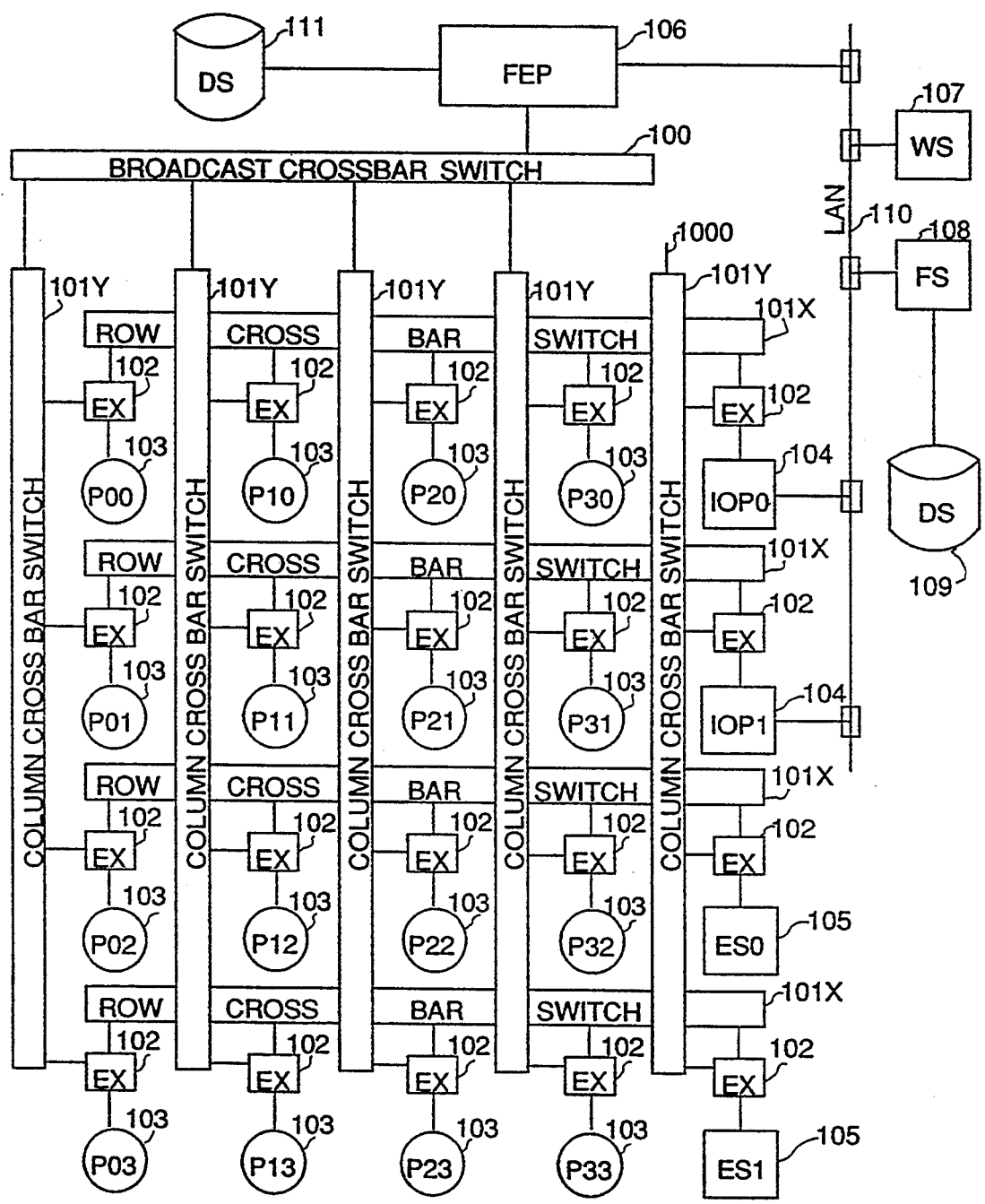
FIG. 1 is a block diagram showing the system configuration of a parallel processor with a two dimensional arrangement according to this invention.

FIG. 1 shows a parallel processor system configuration. The parallel processor system is comprised of: row and column crossbar switches 101 (referred to as 101x in the case of row crossbar switches, 101y in the case of column crossbar switches, and just 101 when they are not differentiated); a plurality of exchangers (EX) 102 for switching between row crossbar switches 101x and column crossbar switches 101y; parallel processing computing clusters (hereinafter each referred to as a computing cluster) 103 configured as an array of i rows and i columns, with computing clusters P00 through P33 by way of example; input/output processors (hereinafter each referred to as an input/output cluster) 104 that perform input/output functions, with input/output processors 10P0 to 10P1 shown by way of example; extended storage processors (hereinafter each referred to as an extended storage cluster) 105 that hold data shared by the computing cluster 103, intermediate results and the like, with extended storage processors ES0 to ES1 shown by way of example; a front-end processor (hereinafter referred to as FEP) 106 that performs administrative functions involved in the parallel processing; a work station (hereinafter referred to as WS) 107 that has an ordinary user interface, such as a keyboard, mouse, light pen and display; a file server (hereinafter referred to as FS) 108 that manages user files; disk systems 109 and 110 that hold user files (hereinafter referred to as DS); and a local-area network (hereinafter referred to as LAN) 110 that performs high-speed communications between nodes on the networks such as work stations WS 107. This embodiment is characterized by each of the crossbar switches 101 having $2^n+1$ ports and the same structure, and by the computing cluster 103 being configured as an array of $2^n$ rows by $2^n$ columns.

In the example shown in FIG. 1 the computing clusters 103 comprise sixteen computing clusters in all, arranged as a two-dimensional array (n=2) of 4-by-4 ($2^n \times 2^n$) units. Therefore, each of the crossbar switches has five ports ($2^n + 1$). However, the invention is valid for any value of n, for example, any number of dimensions.

Each computing cluster/computing cluster 103 is connected via a respective exchanger 102 to a row direction (hereinafter referred to as X direction) crossbar switch 101x and a column direction (hereinafter referred to as Y direction) crossbar switch 101y. FIG. 1 shows two input/output clusters 104 and two extended storage clusters 105, which are respectively connected to the remaining port of each of the X direction crossbar switches 101x. The front end processor (FEP) 106 is connected via a broadcast crossbar switch 100 to the remaining port of each of the Y direction crossbar switches 101y that connect to the computing clusters 103. However, the remaining port 1000 of the Y direction crossbar switch 101y that connects the input/output clusters 104 and extended storage clusters 105 (in the drawing, the one on the right) is not connected to the broadcast crossbar switch 100. This is because the broadcast crossbar switch 100 has been given the same number of ports as each of the crossbar switches 101, and there is therefore no broadcast crossbar switch port for port 1000 to connect to. The broadcast crossbar switch 100 has the same configuration as the crossbar switches 101. Exchangers 102 are provided switch connections between crossbar switches 101 and each of the input/output clusters 104 as well as the extended storage clusters 105. Thus, the arrangement of the computing clusters 103 corresponds to and is numbered P00 to P33 according to a group of points in a two-dimensional space with X coordinates of 0, 1, 2, 3 and Y coordinates of 0, 1, 2, 3. Each of the Y coordinate points 0–3 is provided with a corresponding X direction crossbar switch, and each of the X coordinates is provided with a corresponding Y direction crossbar switch. The arrangement of the input/output clusters 104 and extended storage clusters 105 corresponds to the group of coordinate points X=4, Y=0 to 3. In the following, the network thus constituted by these crossbar switches 101 and exchangers 102 is referred to as a crossbar network.

In this parallel processor system a computation request generated by the WS 107 or the like is received by the FEP 106 via the LAN 110. The FEP 106 also has the same functions as the WS 107 and is able to generate computation requests directly. The FEP 106 performs processing actions such as spooling a computation request and allocating it to an computing cluster 103 to execute the program indicated by the computation request. For this, the FEP 106 has a disk storage system 111. The execution of programs with data by each computing cluster 103 begins by the FEP 106 distributing information for each computing cluster 103 to load a program and then instructing each computing cluster 103 to start executing the program. Upon the computing cluster 103 receiving this the operating information and instructions, the computing cluster 103 sends a request to one of the input/output clusters 104 via the crossbar network and the program and/or data is loaded from the FS 108 via that input/output cluster. When the loading is completed each computing cluster 103 starts to execute its program.

The crossbar network is used when it is necessary to transfer data between computing clusters 103. To send a message from computing clusters P00 to computing clusters P33, for example, the message sent from computing cluster P00 is sent from the exchanger 102 connected to computing cluster P00 to the adjacent X direction crossbar switch 101x (in FIG. 1, the topmost 101x). The message is passed through the crossbar switch 101x, is switched to a crossbar switch 101y (in FIG. 1, the second 101y from the right) by the exchanger 102 connected to P30, and from the Y direction crossbar switch 101y the message is delivered to P33 via the exchanger 102 connected to P33. Similarly, when computing cluster 103 requires input/output part of the way through its computation, a request is made to the input/output cluster 104 via the crossbar network. The input/output cluster 104 thus requested performs an operation in accordance with the contents of the request, and when a response is required sends back the result thereof to the computing cluster 103 that originated the request. Prior to computation by the computing clusters 103 the FEP 106 loads data into the extended storage cluster 105, and during execution this data is accessed by the computing clusters 103 via the crossbar network. During execution, computation results and the like may be directly written into the extended storage cluster 105 by computing cluster 103.

Figure 2:
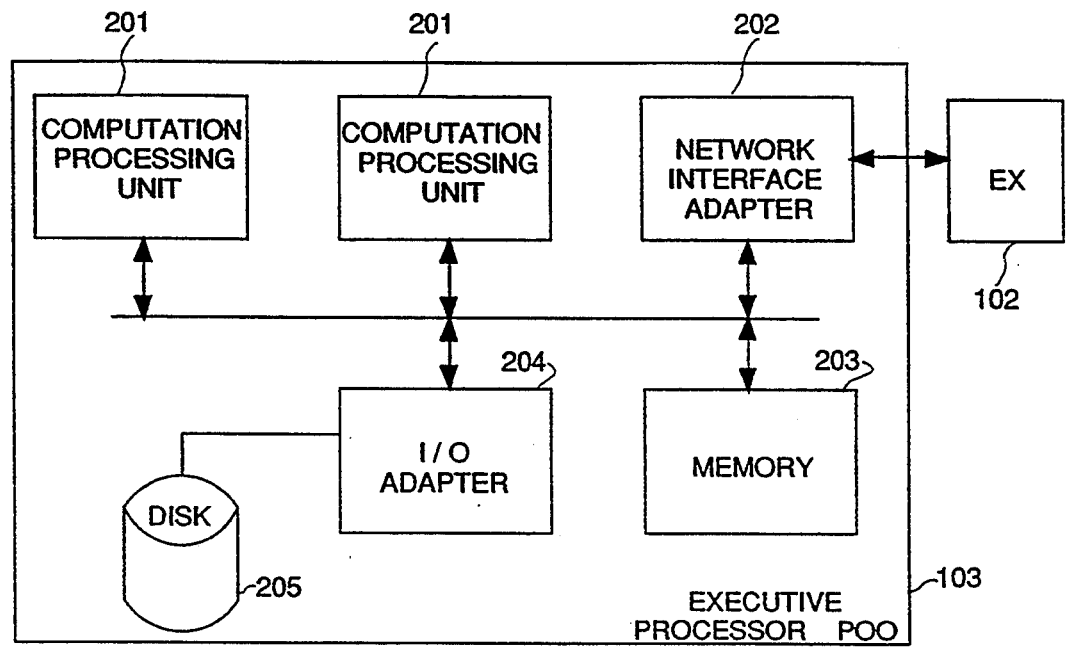
FIG. 2 is a schematic block diagram of a computing cluster/computing cluster used in the configuration of FIG. 1.

The configuration of an computing cluster 103 is shown in FIG. 2. To configure the computing cluster 103 as a general parallel processor with a crossbar network interface, it may comprise, for example, a plurality of computation processing units 201 (for example a CPU), a network interface adapter 202 for transferring data between computing clusters 103 via exchanger 102, a memory 203 (for example, a RAM and a ROM) for storing programs and data, a disk system (DISK) 205 used as a boot device for the operating system (hereinafter referred to as OS) in the computing cluster 103, or as a paging and swap device, and an input/output (I/O) adapter 204 that has an interface with the disk system 205. While in this case there are a plurality of processing units 201 to use the computing cluster 103 as a multiprocessor arrangement, that is as a parallel processor, one or more of the computing clusters may instead be a single processor arrangement with only one computation processing unit 201.

During processing by the processing units 201, the network interface adapter 202 is requested to process requests for data transfer between computing clusters, input/output requests, extended storage accesses, communication with the FEP and so forth. On receiving these requests the network interface adapter 202 assembles the requisite messages and sends them to the crossbar network of crossbar switches 101 via exchanger 102. The network interface adapter 202 also receives messages sent from the crossbar network of crossbar switches 101 and performs the corresponding processing. Examples of such processing include sending interrupts in order to pass messages to the processing units 201 and writing transfer data designated by messages into the memory 203.

Figure 3:
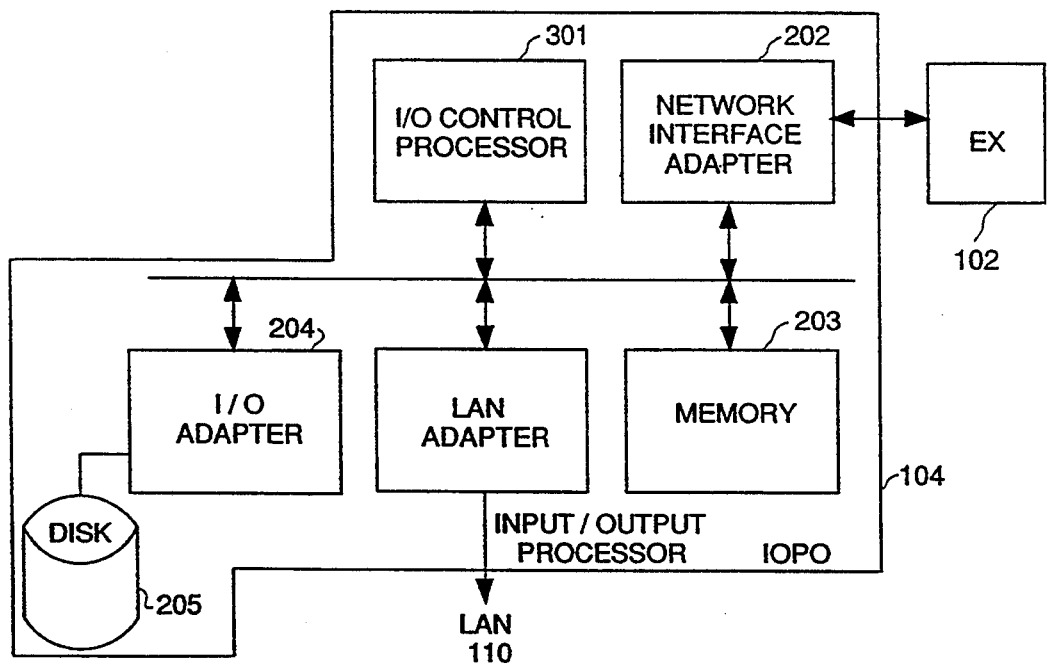
FIG. 3 is a schematic block diagram of an inputs/output cluster processor used in FIG. 1.

FIG. 3 shows the arrangement of an input/output cluster 104 (for example 10P0). Like an computing cluster 103, an input/output processor 104 has a network interface adapter 202, memory 203, input/output (I/O) adapter 204 and disk system 205 (DISK), and in addition has an input/output (I/O) control processor 301 that controls input/output, and a LAN adapter 302 that has an interface with the LAN 110.

In the input/output cluster 104, when an input/output request message from an computing cluster 103 is received by the network interface adapter 202, the message is passed to the input/output control processor 301. In accordance with the message, the input/output control processor 301 implements disk 205 input/output operations via the input/output adapter 204 and the LAN adapter 302. When a response to an computing cluster 103 is required after an input/output operation, a request to execute that process is sent to the network interface adapter 202. In addition to these processes, the input/output cluster 104 possesses file server functions.

Figure 4:
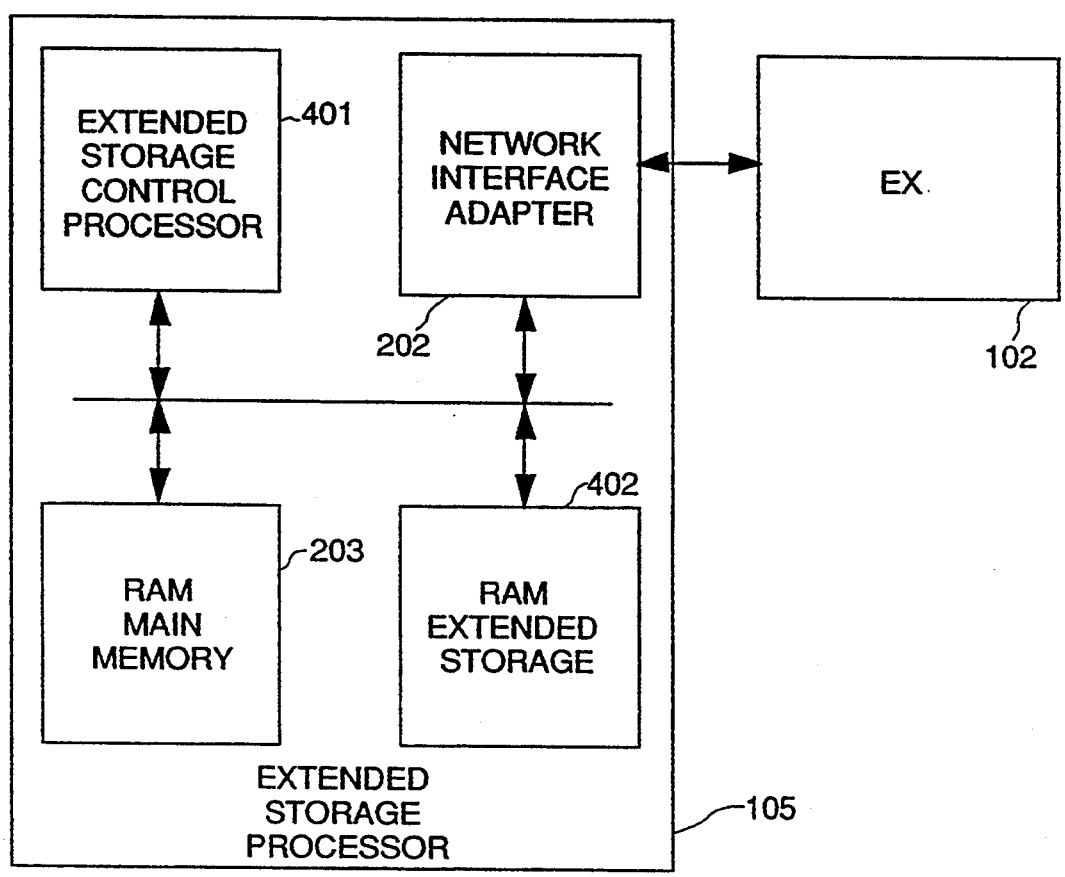
FIG. 4 is a schematic block diagram of an extended storage cluster processor used in FIG. 1.

FIG. 4 shows the configuration of an extended storage cluster 105. The extended storage cluster 105 is comprised of an extended storage control processor 401, network interface adapter 202, RAM main memory 203 and RAM extended storage 402.

The extended storage control processor 401 processes write request messages, extended storage read request messages and the like, described below. When a response to an computing cluster 103 is required after a storage operation, a request to execute that process is sent to the network interface adapter 202. On receiving the request the network interface adapter 202 assembles the requisite message and sends it out to the crossbar network of crossbar switches 101 via exchanger 102. The network interface adapter 202 also receives messages sent from the crossbar network of crossbar switches 101 and performs the corresponding processing. Examples of such processing include sending an interrupt in order to deliver a message to the extended storage control processor 401 and writing extended storage transfer data designated by messages to the extended storage 402. The RAM main memory 203 is for holding programs and data for execution by the extended storage control processor 401. The extended storage control processor 401 may be a general-purpose microprocessor with a memory control unit.

Figure 5:
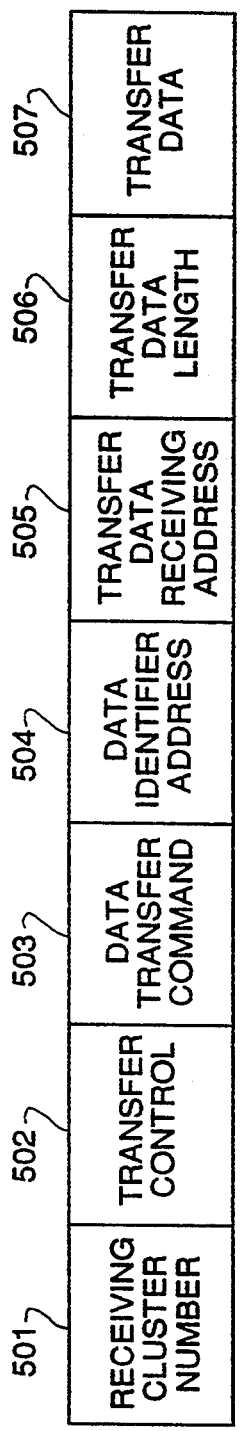
FIG. 5 is a diagram of an inter-computing-cluster data transfer message format according to this invention.

Message transfers will now be explained. FIG. 5 shows the format of a message for data transfer between clusters. The message is comprised of a receiving cluster number 501 that indicates the number of the cluster receiving the message, transfer control 502 that indicates the network transmission method, data transfer command 503 that indicates message type and the method of processing the message in the receiving cluster, data identifier address 504 that is used to notify that delivery of the transfer data 507 to the receiving cluster has taken place, transfer data receiving address 505 used for writing the transfer data 507 to the memory 203 when the transfer data 507 is delivered to the receiving cluster, transfer data length 506 that indicates the length of the transfer data 507, and the transfer data 507.

Figure 6:
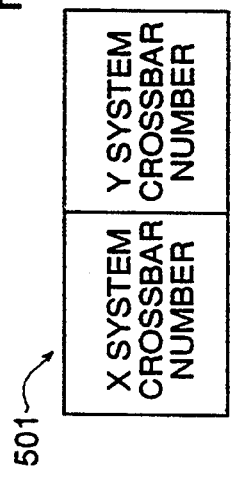
FIG. 6 is a diagram showing the receiving cluster number in a data transfer message according to this invention.

When the program being executed by the processing units 201 transmits a message, the processing unit 201 sends to the network interface adapter 202 the values set for each field 501 to 507 of the message, FIG. 5, along with instructions to generate the message and start the transfer. As shown in FIG. 6, the receiving cluster number 501 is comprised of an X system crossbar number and a Y system crossbar number that determine the X direction/Y direction crossbar switch ports. To transmit data between/within clusters, generally it is easier to designate sending/receiving cluster numbers that have been sequenced by the program or system. For example, in the case of a 16-computing cluster configuration 103 the computing cluster would be numbered from 0 to 15. However, the cluster numbers of the hardware that is actually being used are different. In the case of a 16-computing cluster 4 bits are sufficient for cluster designation, but using crossbar switches with $2^n+1$ ports means that in terms of the hardware a total of 6 bits are required, 3 bits for the X system crossbar numbers and 3 bits for the Y system crossbar numbers. As a consequence the cluster numbers 501 will not run in sequence, and it is therefore necessary to convert the cluster numbers 501 as shown in FIG. 12. This conversion may be done by the network interface adapter 202 in the computing clusters. Conversion of the numbers of the FEP 106 and input/output cluster 104 can also be accomplished in the same way, as shown in FIG. 12.

Figure 7:
FIG. 7 is a diagram showing the transfer control in a data transfer message according to this invention.

Messages transmitted by a cluster arrive at the receiving cluster after being routed by the crossbar switches 101 and exchangers 102 in accordance with the receiving cluster number 501 and transfer control 502 in the message. As shown in FIG. 7, transfer control 502 is comprised of a broadcast control, indicating whether or not the message is to be sent to all clusters, and a transfer sequence control that determines, when the message transmission takes place, whether it first goes in the X direction or the Y direction. This transfer sequence control is not needed when, for example, the crossbar network routing is fixed so that messages are always routed from the X direction to the Y direction. However, the transfer sequence control has been provided for when the configuration is such that it is necessary to transmit messages from the Y direction to the X direction, such as in the case of the transfer of data from the clusters to the FEP 106.

Upon the message being delivered, in the receiving cluster, the network interface adapter 202 examines the message's data transfer command 503 and in accordance with the transfer data receiving address 505 the transfer data 507 is written into the memory 203. The information indicating that the transfer data 507 has been written to the memory 203 also is written into the memory 203 in accordance with the data identifier address 504. The processing unit 201 of the receiving cluster uses the data identifier address 504 to monitor the memory 203 and determines that the transfer data 507 has been delivered.

The broadcasting of message transfers will now be described. When an exchanger 102 determines that the broadcast control in the transfer control 502 of the message sent by the associated computing cluster 103 indicates broadcast, the message is sent to the X direction crossbar switch 101x to which the exchanger 102 is connected. After confirming that it is possible to transmit to all exchangers 102 the above X direction crossbar switch 101x of the sending exchanger 102 transmits the message. From the exchangers 102 to which the broadcast message is sent by the X direction crossbar switch 101x, the message is transferred to the respective Y direction crossbar switches 101y to which the X direction crossbar switch 101x concerned is connected. In the same way, the broadcast message is transferred from each Y direction crossbar switch 101y to its exchangers 102, and the message is then transferred from each of the exchangers 102 to the computing cluster 103 to which the exchanger 102 is connected. This is how message transfers are broadcast.

The transferring of messages between the FEP 106 and the computing clusters 103 will now be described. With reference to FIG. 1, broadcast crossbar switch 100 ensures efficient transfer of messages between the FEP 106 and the computing clusters 103. This enables messages to be transferred between the FEP 106 and any of the computing clusters 103 via just the broadcast crossbar switch 100 and one of the Y direction crossbar switches 101y.

In the system configuration as shown in FIG. 1, for example, message transfer from computing cluster 103 P00 to FEP 106 is accomplished in the same way as message transfer between computing clusters 103, by the message being transmitted by the network interface adapter 202 connected to P00. At this time, the receiving cluster number 501 of the message, as shown by the cluster number conversion table of FIG. 12, is converted to X system crossbar number=4, Y system crossbar number=4 that indicates the FEP 106. Also, as shown in FIG. 10, the transfer sequence control (FIG. 7) of transfer control 502 (FIG. 5) is set to 1 to cause the message to be transmitted to the Y direction crossbar switch 101y and from the Y direction crossbar switch 101y to the X direction crossbar switch 101x. The message sent from the network interface adapter 202 goes first to the exchanger 102 connected to P00. In accordance with the transfer sequence control (in 502) of the message, the exchanger 102 sends the message to the Y direction crossbar switch 101y connected thereto. In accordance with the routing information shown in FIG. 8 (details of which are given below), the Y direction crossbar switch 101y sends the message to the port 804 that matches the Y system crossbar number of the receiving cluster number 501 contained in the message. In this case, the broadcast switch 100 is connected to this port. Message transfer to the FEP 106 is performed by the broadcast switch 100 sending the message to the port 804 that matches the X system crossbar number in the receiving cluster number 501 of the message.

Message transfer from FEP 106 to computing cluster 103 P00 is accomplished in the same way as message transfer between computing clusters 103, by the message being transmitted via the network interface adapter 202. At this time, the receiving cluster number 501 of the message, as shown by the cluster number conversion table of FIG. 12, is converted to X system crossbar number=0, Y system crossbar number=0 that indicates computing cluster 103 P00. Also, as shown in FIG. 10, the transfer sequence control of FIG. 7 is set to 0 to cause the message to be transmitted from the X direction crossbar switch to the Y direction crossbar switch. The message from the network interface adapter 202 of FEP 106 is sent first to the broadcast switch 100. In accordance with the routing information shown in FIG. 8 (details of which are given below), the broadcast switch 100 sends the message to the port 804 that matches the X system crossbar number of the receiving cluster number 501 contained in the message. In this case, the left most Y direction crossbar switch 101y is connected to this left most port 804. The Y direction crossbar switch 101y sends the message to the port 804 that matches the Y system crossbar number in the receiving cluster number of the message. This port is connected to the exchanger 102 that is connected to P00, whereby the message is sent to computing cluster 103 P00.

Broadcasting of transfers from the FEP 106 to all of the computing clusters 103 is accomplished in the same way as message transfer between the computing cluster 103, by the message being transmitted by the network interface adapter 202. This time the content of the receiving cluster number 501 does not matter. Also, as shown in FIG. 10, the transfer sequence control (FIG. 7) is set to 0 to cause the message to be transmitted from the X direction crossbar switch 101x to the Y direction crossbar switch 101y. Moreover, the broadcast control (FIG. 7) in the message indicates broadcast. The message from the network interface adapter 202 of the FEP 106 is sent first to the broadcast crossbar switch 100. As broadcast is indicated, the broadcast crossbar switch 100 confirms that transmission to all ports is possible and transmit the message. When the broadcast message has been sent to each of the Y direction crossbar switches 101y, the Y direction crossbar switches 101y transmits the message to each exchanger 102 after confirming that message transmission to all exchangers 102 is possible.

In broadcasts by the FEP 106 to all of the computing clusters 102, unlike transfers between computing cluster 103, it is possible to route broadcast transfer of messages to all computing clusters 103 via just the broadcast switch 100 and the Y direction crossbar switches 101y, without using the X direction crossbar switches 101x. Also, by using the broadcast switch 100 transfer of messages from all of the computing cluster 103 to the FEP 106 can be accomplished without using the Y direction crossbar switches 101y, which makes it possible to minimize interference to other message transfers being executed between computing clusters within the network. If the FEP 106 was located where the input-/output cluster 104 is at the top right in FIG. 1, the plurality of messages transmitted from the computing clusters 103 would become concentrated in the X direction crossbar switch 101x to which the FEP 106 is connected, obstructing the transfer of other messages via that X direction crossbar switch 101x, but with this embodiment there is no such problem using the broadcast crossbar switch 100.

Figure 8:
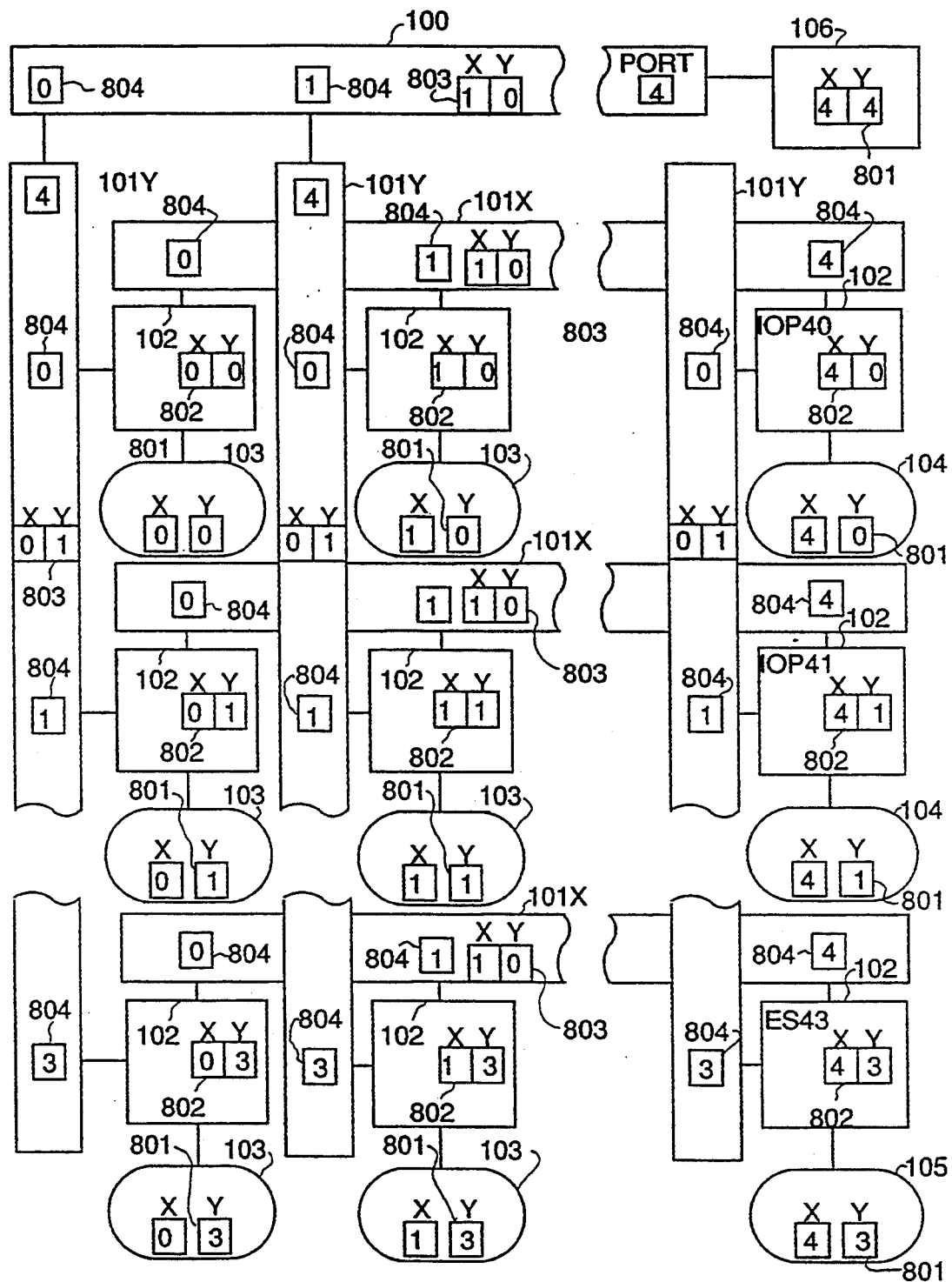
FIG. 8 is a diagram showing the data transfer routing information used in FIG. 1.

The method of operating the network will now be described in more detail. FIG. 8 shows the requisite routing information for message transfer. This routing information is set beforehand when the system is started up. The computing clusters 103, input/output clusters 104, extended storage clusters 105 and the FEP 106 each have their own-cluster number 801 that is added to a message, such as when the sending cluster requires a response. When a receiving cluster returns the associated message the number 801 is used as the receiving cluster number 501. Each of the exchangers 102 has an own-cluster number 802 corresponding to the processor connected thereto. This number 802 is compared with the receiving cluster number 501 of the message. In accordance with the result of such comparison, the exchanger 102 passes the message to the connected processor of the same number or the connected crossbar switch depending upon receiving or transmitting. Each crossbar switch 101 has crossbar switch dimension information 803 that indicates the dimension, X direction or Y direction, of the crossbar switch 101, and a port number 804 that indicates where the ports of each crossbar switch 101 are connected. In the routing procedure in a crossbar switch 101, the crossbar switch dimension information 803 determines whether the X system crossbar number or the Y system crossbar number is to be extracted from the message receiving cluster number 501. The crossbar switch dimension information 803 is also used to compare the X system crossbar number or Y system crossbar number extracted from the receiving cluster number 501 with the port 804 number and send the message to the matching port.

FIG. 9 shows the configuration of an exchanger 102, with all the exchangers 102 having the same structure. For each port, e.g., leading to an exchanger 102 there is: a first in, first out (hereinafter referred to as FIFO) memory 901 that temporarily holds messages transferred from a cluster and a crossbar switch connected to the exchanger 102; a routing control 902 that extracts messages held in the FIFO 901, uses the receiving cluster number 501 and transfer control 502 in the messages to determine the transfer destination; a message transfer control 903 that determines the priority of requests from the routing control 902 and sends the messages to each port; and register R that holds an own-cluster number 802.

FIFO 901 can perform read and write operations asynchronously. A commercially-marketed FIFO LSI may be used. The routing control 902 is constituted by a FIFO read control 921 and a transfer destination determination circuit (transfer circuit) 922. The FIFO read control 921 confirms that the Empty signal 911 output by the FIFO 901 is 0, sends a read strobe 912 and reads out messages held in the FIFO 901. The Empty signal 911 is 1 when there is no data in the FIFO 901 and 0 at all other times.

As shown in the table of FIG. 10 that is held in register (R) 924, in the transfer destination determination circuit 922, the X system crossbar number and Y system crossbar number of the receiving cluster number 501 in a message that is read out are compared with the respective X system crossbar number and Y system crossbar number of the own-cluster number 802 held in each exchanger 102. Based on the comparison result, the contents of the transfer sequence control of the transfer control 502 is used to determine whether the transfer should start from the X direction or from the Y direction. Regarding the operation of the transfer destination determination circuit 922: when the transfer sequence control specifies transfer from the X direction to the Y direction (that is, the transfer sequence control is 0), when the X system crossbar number comparison result is 0 (meaning an unmatch) and the Y system crossbar number comparison result is 0, transfer to the X system crossbar switch is indicated; when the X system crossbar number comparison result is 0 and the Y system crossbar number comparison result is 1 (a match), transfer to the X system crossbar switch is indicated; when the X system crossbar number comparison result is 1 and the Y system crossbar number comparison result is 0, transfer to the Y system crossbar switch is indicated; and when the X system crossbar number comparison result is 1 and the Y system crossbar number comparison result is 1, transfer to the cluster is indicated. A signal 923 associated with the transfer destination determined by the transfer destination determination circuit 922 is used to instruct the message transfer control 903 to transmit the message thereto.

The message transfer control 903 is constituted by priority control 931 and selector 932. The priority control 931 receives signals 923 from each routing control, sets the order of transmission priority among them and transmits this order to them. The message transfer control 903 confirms that the Full signal 904 (FIG. 11) output by the FIFO 901 provided in the transfer destination 100, 101, similarly to the FIFO 901 in the exchanger 102, is 0, outputs a write strobe 905 and writes the message into the destination FIFO. The Full signal 904 is 1 when the destination FIFO is full and unable to accept any more data, and is 0 at all other times. When the message transfer is not completed in one transmission the priority control 931 uses a signal 933 at each transmission instructing the related FIFO read control 921 to read out the next data from the FIFO 901.

Exchanger 102 operations relating to broadcasting of message transfers will now be described. As described above, the message transfer order is sending computing cluster 103, exchanger 102, X direction crossbar switch 101x, exchanger 102, Y direction crossbar switch 101y, exchanger 102, and all computing clusters 103.

First, a message is sent from an computing cluster 103 to the exchanger 102. The routing control 902 of the exchanger 102 then uses the broadcast control contained in the message to determine whether broadcast is designated. In accordance with the port number in the output port number register 924 the routing control 902 outputs the broadcast message to the port connected to the X direction crossbar switch 101x.

The output port number register 924 holds information indicating the port to which the broadcast message is to be output. In this case, the contents of the output port number register 924 are set so that the routing control 902 that receives the broadcast message from the computing cluster 103 outputs it to the X direction crossbar switch 101x, the routing control 902 that receives the broadcast message from the X direction crossbar switch 101x outputs it to the Y direction crossbar switch 101y, and the routing control 902 that receives the broadcast message from the y direction crossbar switch 101y outputs to the cluster. When the routing control 902 of the exchanger 102 determines that a broadcast message transmitted from the X direction crossbar switch 101x is designated for broadcasting, in accordance with the port number in the output port number register 924 the routing control 902 outputs the broadcast message to the port connected to the Y direction crossbar switch 101y. Similarly, when the routing control 902 of the exchanger 102 determines that a broadcast message transmitted from the Y direction crossbar switch 101y is designated for broadcasting, in accordance with the port number in the output port number register 924 the routing control 902 outputs the broadcast message to the port connected to the cluster. For broadcast message transfer, operations other than these are the same as other transfer control.

FIG. 11 shows the crossbar switch configuration. For each port the crossbar switch 101 is provided with a message receiving control 1101 that temporarily holds messages sent from the exchanger 102 to which it is connected and reads out the messages when requested, and a message transfer control 1102 that uses the receiving cluster number 501 and transfer control 502 to determine whether the message output is to that port of that switch, determines the priority of requests from the message receiving control 1101 and sends the messages to each port.

The message receiving control 1101 is constituted by a FIFO 901 that temporarily holds messages, and a FIFO read control 1110 that outputs messages held in the FIFO 901 to the register 1111. Similarly to the exchangers, the FIFO read control 1110 confirms that the Empty signal 1112 output by the FIFO 901 is 0, transmits a read strobe 1113, reads out messages stored in the FIFO 901 and places them in the register 1111. The Empty signal 1112 is 1 when there is no data in the FIFO 901 and it is 0 at all other times. Signal 1122 notifies the message transfer control 1102 when the message is output from the FIFO 901 to the register 1111.

With the signal 1122, in accordance with crossbar switch dimension information 803, held in register R, the message transfer control 1102 determines whether the X system crossbar number or the Y system crossbar number is to be extracted from the receiving cluster number 501 in the message read out from each message receiving control 1101. Then, the X system/Y system crossbar numbers extracted from the receiving cluster number 501 and a register R at port 804 numbers are compared by the match circuit 1120. If the comparison result is a match the decision is made to send the message to that port. If there is no match no operation takes place. The transmission sequence among the message receiving controls 1101 of the matched messages is decided by the priority control 1121. The priority control 1121 confirms that the Full signal 904 output by the FIFO provided in the transfer destination (similarly to the exchanger) is 0, outputs a write strobe 905 and writes the message into the destination FIFO. The Full signal 904 is 1 when the destination FIFO is full and unable to accept any more data, and is 0 at all other times. The priority control 1121 uses signal 1123 to inform the message receiving control 1101 that the message has been written into the destination FIFO. Based on this signal 1123, the message receiving control 1101 reads out the next message. When the message transfer is not completed in one transmission, the priority control 1121 uses signal 1124 at each transmission to instruct the related FIFO read control 1110 to read out the next data from the FIFO 901.

Crossbar switch 101 operations relating to broadcasting of message transfers will now be described. The FIFO read control 1110 uses the broadcast control included in the message to determine whether broadcast is designated, and upon recognizing that it is a broadcast message transfer, signal 1122 is used to inform all message transfer controls 1102 that the message has been output from the FIFO 901 to the register 1111. Each of the message transfer controls 1102 then perform the same operations described above, using signal 1123 to inform the message receiving control 1101 that the message has been written into the destination FIFO. The message receiving control 1101 determines that signal 1123 has been received back from all message transfer controls 1102. When the signal 1123 has been received back from all message transfer controls 1102, the next message is read out. When the signal is not returned by all message transfer controls 1102, the next message is not read out until all the signals 1123 are returned. Also, if the message transfer is not completed in one transmission, the priority control 1121 uses signal 1124 at each transmission to instruct the related FIFO read control 1110 to read out the next data from the FIFO 901.

Figures 13, 14:
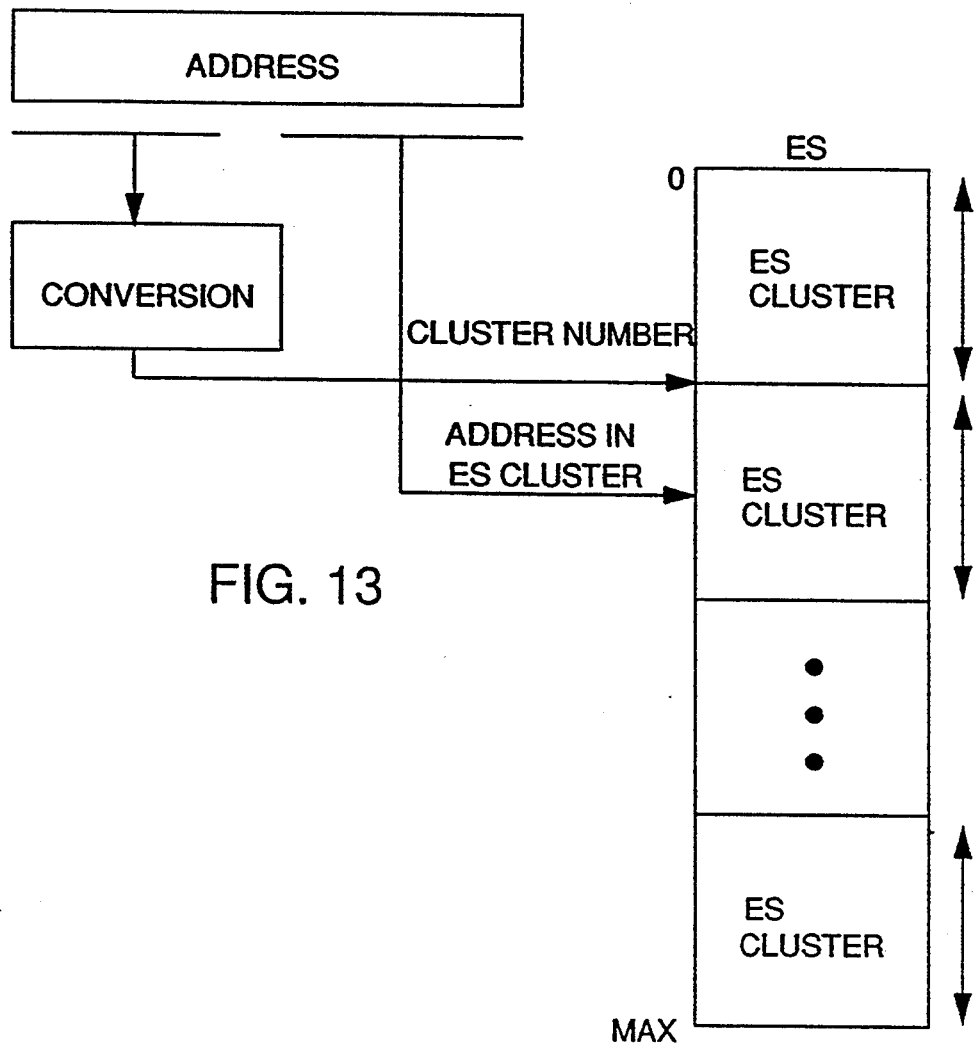
FIG. 13 is a diagram showing the extended storage space according to this invention.
FIG. 14 is a diagram showing the extended storage cluster number conversion used in the configuration of FIG. 1.

Extended storage cluster accessing will now be described. FIG. 13 shows the address space of the extended storage. The extended storage is connected to crossbar switches as shown in FIG. 1, forming a distributed arrangement. To the software, the extended storage appears to be a single address space independent of the memory of the computing clusters. The extended storage 402 (FIG. 4) in each extended storage cluster 105 is a contiguous region in part of this space. The data in each extended storages 402 is used after it has been transferred to memory 203 in the computing cluster 103. Access to each extended storage cluster 105 from each computing cluster 103 is via the crossbar network crossbar switches 101, similarly to data transfers between computing clusters. Extended storage addresses designated by the computing clusters are extended to an address that spans the extended storage cluster. Because of this, in actual accesses this address is divided into a cluster number that designates one out of multiple extended storage clusters 105 and internal extended storage addresses that are determined by the maximum storage capacity of one extended storage cluster. This extended storage cluster number is obtained by conversion of the high-order bits of the address designated by the computing cluster 103. If for example the extended storage address is 32 bits wide and the extended storage 402 (FIG. 4) of the extended storage cluster 105 has a maximum capacity of 256 megabytes ($2^{28}$), the number of extended storage address bits that are converted to extended storage cluster numbers will be the 4 high-order bits. The conversion method in this case, with this configuration, is shown in FIG. 14 with such 4 high-order bits being the INPUT. In this case only two extended storage processors 105 are connected to the crossbar network, so when the high-order 4 bits of the extended storage address are $(0000)_2$ the high-order bits will be converted to X system crossbar number=4, Y system crossbar number=2 (see FIG. 8). When the high-order 4 bits of the extended storage address are $(0001)_2$ the conversion will be to X system crossbar number=4, Y system crossbar number=3. This conversion may be implemented by the network interface adapter 202 of the computing cluster 103. (FIG. 2).

Figure 20:
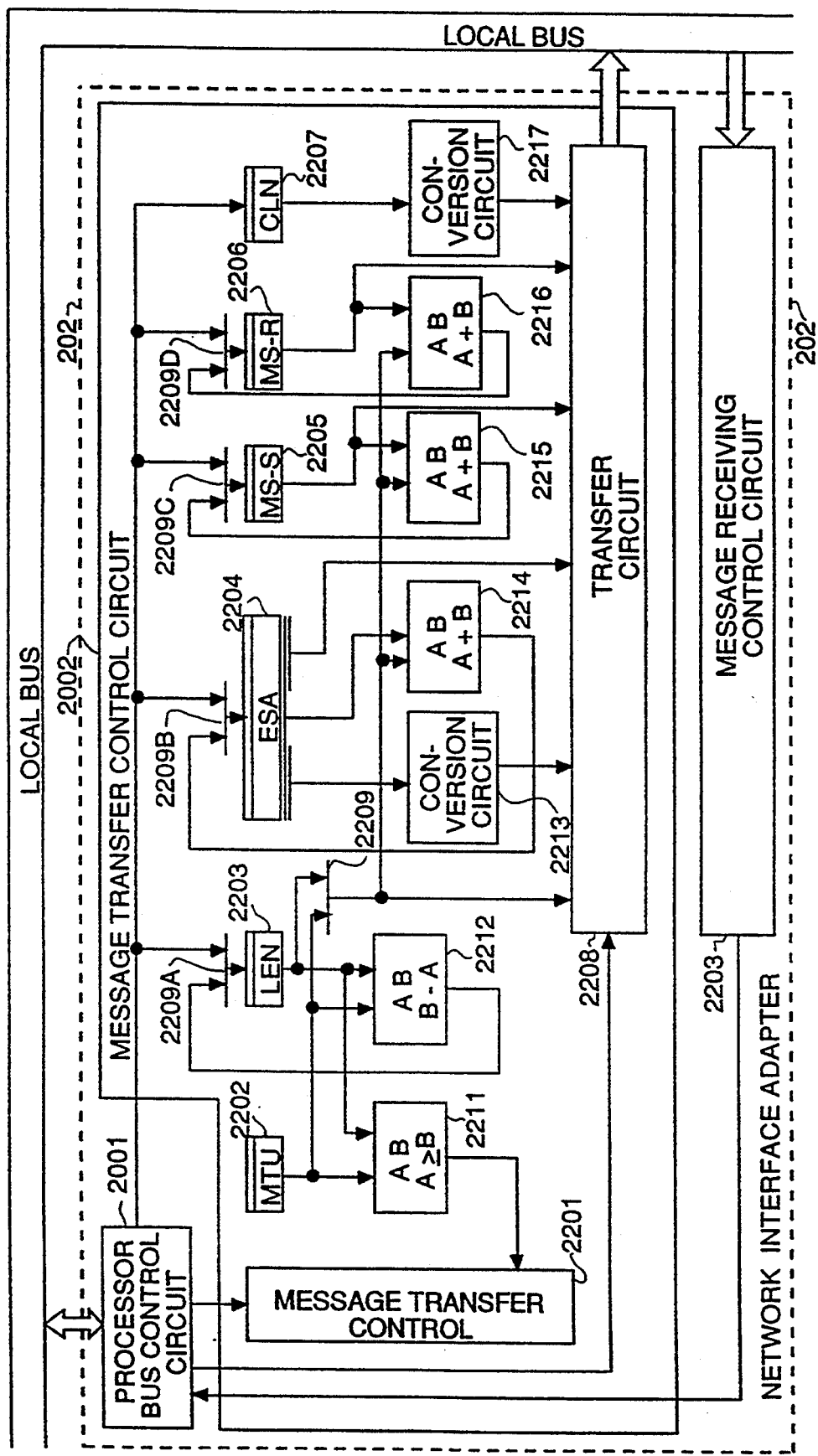
FIG. 20 is a block diagram of a network interface adapter according to this invention.

FIG. 20 is a block diagram of the network interface adapter 202. This is constituted by a processor bus control circuit 2001 that controls interfacing with the associated processor, memory and so forth over a local bus, message transfer control circuit 2002 that transmits messages to the crossbar network in accordance with instructions from the processor bus control circuit 2001 over the local bus, and a message receiving control circuit 2003 that receives messages from the crossbar network and sends interrupts to the processing units 201 of the cluster, writes transfer data designated by the message to the memory 203 and does other such control processing over the local bus.

The message transfer control circuit 2002 is comprised of a message transfer control 2201 that controls transfers, a maximum transfer data length register 2202 (hereinafter referred to as MTU) that holds the maximum number of bytes of the transfer data generated by the hardware, transfer data length register 2203 (hereinafter referred to as LEN) that holds the transfer data length designated by the processing unit, an extended storage address register 2204 (hereinafter referred to as ESA) that holds the extended storage address designated by the processing unit, a transfer memory address register 2205 (hereinafter referred to as MS-S) that holds the address used to access memory in the own cluster as designated by the processing unit, a receiving memory address register 2006 (hereinafter referred to as MS-R) that holds the address used to access the memory of the cluster on the receiving side as designated by the processing unit, a cluster number register 2207 (hereinafter referred to as CLN) that holds the receiving cluster number as designated by the processor, a comparator 2211 that compares MTU 2202 and LEN 2203, a subtractor 2212 that subtracts MTU 2202 from LEN 2203, a conversion circuit 2213 that converts the high-order bits of the ESA 2204 to extended storage cluster numbers, adder 2214 that adds the ESA 2204 and MTU 2202 (selected by selector 2209), adder 2215 that adds MS-S 2205 and MTU 2202 (selected by selector 2209), adder 2216 that adds MS-R 2206 and MTU 2202 (selected by selector 2209), conversion circuit 2217 that performs conversion to receiving cluster numbers from the CLN 2207, and a transfer circuit 2208 that inputs the contents of the above registers and the like as indicated by the message transfer control, reads out transfer data from memory, and assembles and sends messages onto the crossbar network. Other selectors 2209A-2209D perform functions as indicated.

Message transfer processing by the computing cluster 103 for writing data to the extended storage in this configuration will now be described. For writing to the extended storage, from the processor, with respect to the network interface adapter 202, the transfer data length is set in LEN 2203, the extended storage address for writing transfer data to the extended storage is set in ESA 2204, the main memory address for read-out from the own cluster memory of data for writing to extended storage is set in MS-S 2205, and extended storage access classification (write requests) is set. Note however that access classification is maintained by the message transfer control 2201. Nothing is set in registers not related to extended storage writes (in this case, MS-R 2206 and CLN 2207).

Concerning MTU 2202, if the processing unit designates a very long transfer data length and without modification, this is assembled into messages to be sent out on the crossbar network, transfer of these messages will monopolize the crossbar network for long periods and affect other message traffic. The maximum length of message transfer data is therefore set beforehand, so for transmission, messages that exceed that length are divided according to this maximum transfer data length. This maximum transfer data length is held in MTU 2202 and the value is set when the system starts up.

The operating sequence of the message transfer control circuit 2002 will now be described.

(1) The message transfer control 2201 determines that the necessary registers for writing to the extended storage are set.

(2) The comparator 2211 determines that transfer data length LEN 2203 designated by the processing unit is equal to, or less than, the maximum transfer data length MTU 2202 of messages generated by the hardware, and passes the results to the message transfer control 2201.

(3) When the transfer data length designated by the processor in LEN 2203 exceeds the maximum transfer data length of messages generated by the hardware in MTU 2202, the message transfer control 2201 controls selector circuit 2209 to select the transfer data length of the MTU 2202 and send it to the transfer circuit 2208. Also, the high-order bit width is converted to cluster numbers by conversion circuit 2208. The remaining bits of the ESA 2204 and MS-S 2205 are sent as-is to the transfer circuit 2208.

(4) The message transfer control 2201 then instructs the transfer circuit 2208 to transmit the message.

(5) In the transfer circuit 2208, in accordance with the address in MS-S 2205 the transfer data is read out from the cluster memory to the amount of the length of the transfer data, which is combined with information required for transmitting the message, and this combination is then transmitted as a message to the crossbar network 100, 101.

(6) The transfer circuit 2208 notifies the message transfer control 2201 when the message transfer has been completed.

(7) When the message transfer control 2201 is informed by the transfer circuit 2208 that the message transfer has been completed, the value of MTU 2202 is added to the values of ESA 2204 and MS-S 2205 by the respective adders 2214 and 2215. The result of this addition is then the starting addresses of data immediately following the message data just sent, which new addresses are set in the ESA 2204 and MS-S 2205 respectively.

(8) Following this, the data of MTU 2202 is subtracted from the data of LEN 2203 by subtractor 2212 and the result is set in LEN 2203 as the length of the remaining unsent portion of the data that is desired to be sent.

(9) The above mentioned steps from (2) to (8) are repeated until the value in LEN 2203 is equal to or lower than the value in the MTU 2202.

(10) When the value in LEN 2203 has become equal to or lower than the value in the MTU 2202 the message transfer control 2201 controls the selector circuit 2209 to select the transfer data length of LEN 2203 and send it to the transfer circuit, which repeats the operations of (2) to (8) just once to complete the process of transmitting the 103 message from the computing cluster 103 for writing data to the extended storage.

When access to the extended storage clusters 105 involves multiple extended storage clusters 105, if for example message transfer for extended storage access is in 4-kilobyte units and a 4-kilobyte boundary and the transfer data length in MTU 2202 of messages generated by the hardware is 8 kilobytes, converting an extended storage address by an add operation enables processing to be carried out with this configuration even when extended storage access extends to a plurality of extended storage clusters.

Even when the network interface adapter 202 of FIG. 20 is arranged in, input/output cluster 104, extended storage cluster 105 or FEP 106, data transfer even between processors can be realized in the same way as extended storage accesses, using the MTU 2202, LEN 2203, MS-S 2205, MS-R 2206, CLN 2207 and so forth.

FIGS. 15A-F show the formats of extended storage access messages. These messages include: locking messages for extensive exclusion control between computing clusters as shown in FIGS. 15A-C, read messages of FIGS. 15D and E and write messages of FIG. 15F. Similarly to messages transmitting data between computing clusters, receiving cluster numbers, transfer controls and data transfer commands related to locking, reading and writing are assigned to the messages of FIGS. 15A-F.

Locking variables are defined on the extended storage and used for exclusion control between computing clusters. When a lock request message of FIG. 15A from the computing cluster is delivered to the network interface adapter 202 of the extended storage cluster 105, the message is passed to the extended storage control processor 401. In the extended storage control processor 401, accordingly extended storage data is read out from extended storage 402. This extended storage data and the comparison data in the message are compared, and if they are equal the storage data in the message is stored at that extended storage address. If they are not equal this storage operation does not take place.

An arrangement is used whereby during the comparison and storage processes, other extended storage access-related processes do not take place at the network interface adapter 202. The extended storage control processor 401 generates a condition code based on the results of the comparison.

The necessary information for returning the lock response message of FIG. 15B to the processor is set in the network interface adapter 202 and the request is implemented. At the network interface adapter 202 the lock response message of FIG. 15B is assembled and the message is transmitted to the network of crossbar switches 100, 101. The lock response message of FIG. 15B received by the processor is passed to the processor's processing unit 201 (FIG. 2) along with the contents of the condition code providing the information that locking has taken place.

With respect to unlocking, an unlock request message of FIG. 15C is transmitted from the processor. When this message arrives at the extended storage cluster 105, the storage data is written by the network interface adapter 202 without the message being passed to the network control processor 401. This completes the unlocking process.

With respect to extended storage read processes, the processor performs extended storage address conversion and transmits a read request message of FIG. 15D. When the read request message of FIG. 15D reaches the network interface adapter 202 of either extended storage cluster 105 (FIG. 4), the message is passed to the extended storage control processor 401. The extended storage control processor 401 interprets the message and sets into the network interface adapter 202 the information needed for reading the extended storage data, and requests transmission of the extended storage data message of FIG. 15E. At the network interface adapter 202, in accordance with the information set by the extended storage control processor 401, the extended storage data is read to the amount of the read data length and the read response message of FIG. 15E is prepared and sent onto the network. With respect to the processor that receives the read response message of FIG. 15E, the network interface adapter 202 (FIG. 2) writes the message into memory 203 (FIG. 2) in accordance with the read data storage address contained in the message, and processing unit 301 (FIG. 2) is informed that the extended storage read data has been delivered.

Concerning extended storage write processes, the processor performs the above-mentioned extended storage address conversion and transmits a write request message of FIG. 15F. At the network interface adapter 202 of the extended storage cluster 105 that receives the message, in accordance with the extended storage address contained in the message, the write data length is written into the extended storage 402 to the amount of the write data length.

The input/output process will now be described. As shown in FIG. 1, the input/output clusters 104 are each connected to an X direction crossbar switch 101x and a Y direction crossbar switch 101y, forming a distributed arrangement. Access to each of the input/output clusters 104 is via the crossbar network of crossbar switches 100, 101, similarly to data transfers between computing clusters 103. Input/output clusters 104 are connected to an X direction crossbar switch 101x and a Y direction crossbar switch 101y to enable each of the input/output clusters 104 to be accessed by all computing clusters 103. If, for example, an computing clusters 103 connected to X direction crossbar switches 101x accessed only an input/output clusters 104 connected to the same crossbar switch 101x, there would be no need for the right most Y direction crossbar switch 101y.

Input/output from computing clusters 103 is executed by input/output commands. The input/output commands designate cluster number, input/output device number, or file name, or the like, and pass this information to the network interface adapter 102 of the computing cluster. At the network interface adapter, similarly to message data transfers between computing clusters 103, input/output cluster numbers designated by a command are converted to the receiving cluster numbers used by the hardware. Transfer control, transfer data length and so forth are generated for the hardware header of the message. Transfer data in messages is data for writing to input/output devices or information used for input/output protocols and the like, and this is sent as a message to the network along with the hardware header.

The network interface adapter 202 (FIG. 3) of the input/output cluster that receives the message passes control to the input/output control processor 301 of the input/output cluster 104. The input/output control processor 104 interprets the contents of the message transfer data and via the input/output adapter 204, LAN adapter 302 and the like, processing proceeds between the input/output control processor and the actual input/output devices that correspond to the message transfer data. The UNIX operating system or the like may be used for this processing. When a response to the computing cluster 103 is required after an input/output operation, a request to execute that process is sent to the network interface adapter 202 by the input/output control processor 301.

Figure 16:
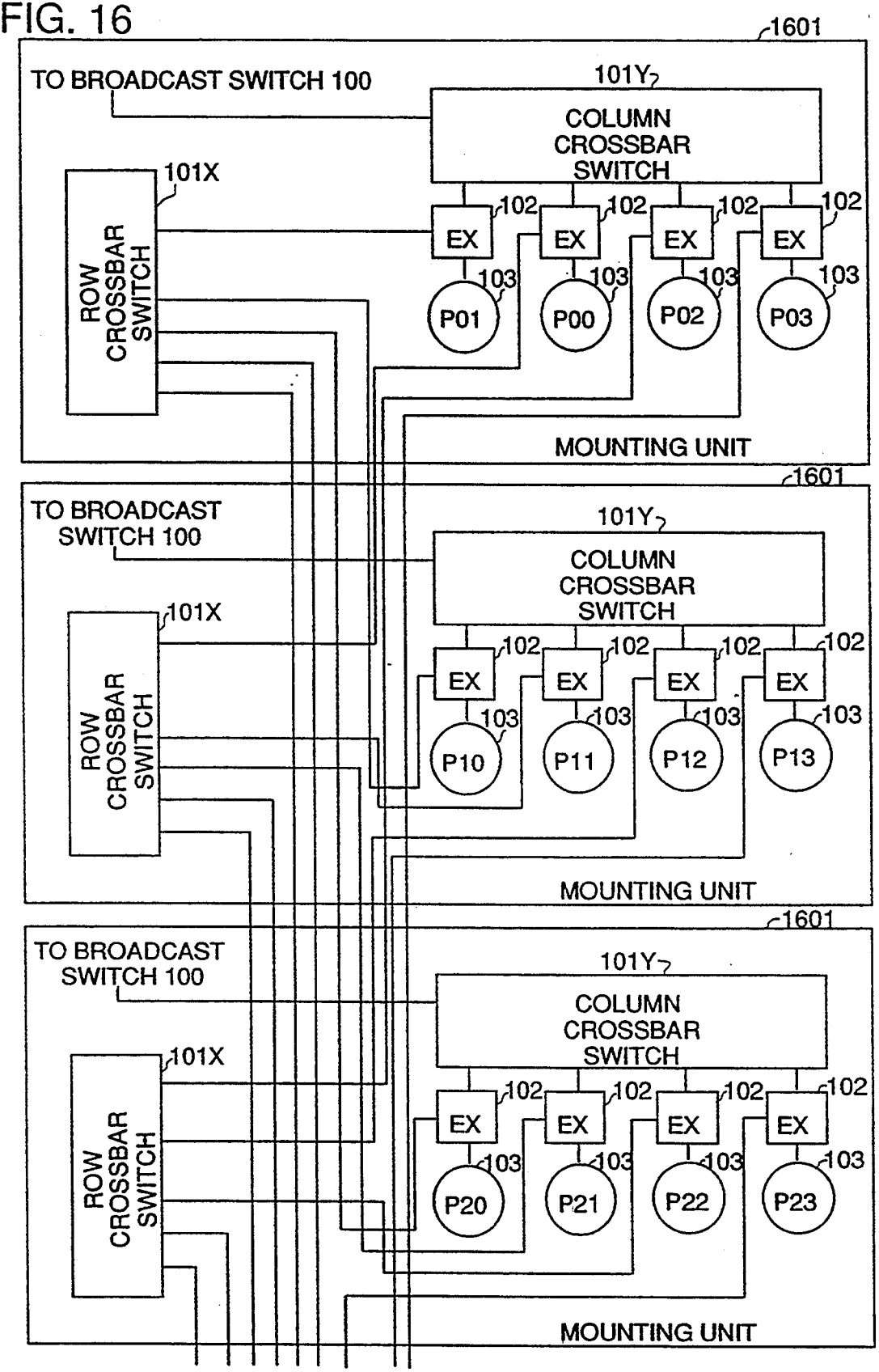
FIG. 16 is a diagram showing the mounting of executive parallel processors of FIG. 1.

Mounting for the parallel processor system according to this invention will now be explained. FIG. 16 shows the mounting used with the configuration shown in FIG. 1. Each mounting unit 1601, corresponds to any one of a frame, a package, an LSI and the like single mounting element. This mounting unit 1601 includes a Y direction crossbar switch 101y, four exchangers 102 connected thereto, four computing clusters 103 connected thereto, an X direction crossbar switch 101x, and input/output wiring as shown.

Figure 21:
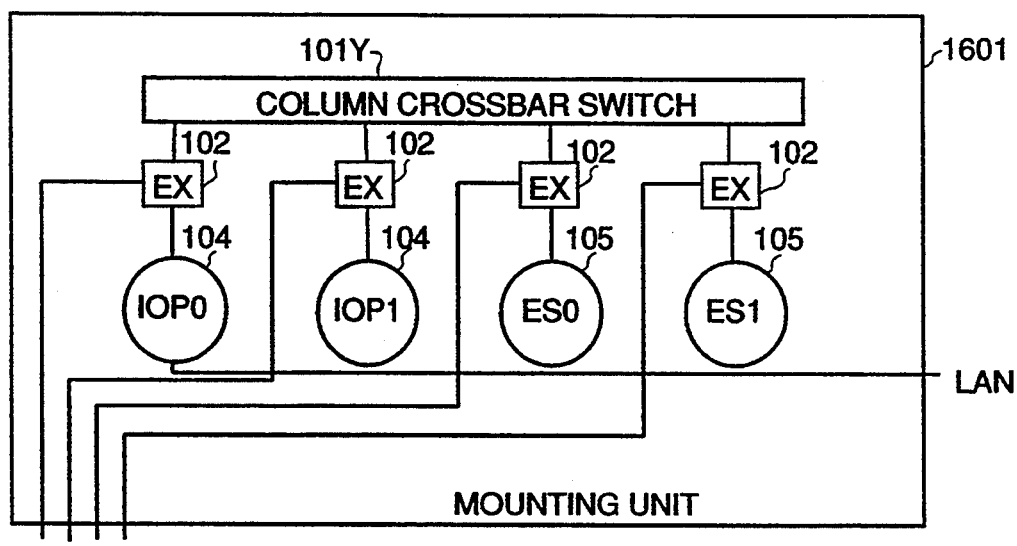
FIG. 21 is a mounting of auxiliary processors in accordance with this invention.

For another mounting unit, shown in FIG. 21, four computing clusters 103 is replaced in the amounting unit 1601 by the two input/output processors 104 and the two extended storage processors 105. Similarly, on another mounting unit (shown in FIG. 22), the FEP 106 replaces the computing clusters and is connected to the broadcast crossbar switch 100. These mounting units of FIGS. 16, 21 and 22 are mounted separately from and are otherwise identical to each other.

Figure 22:
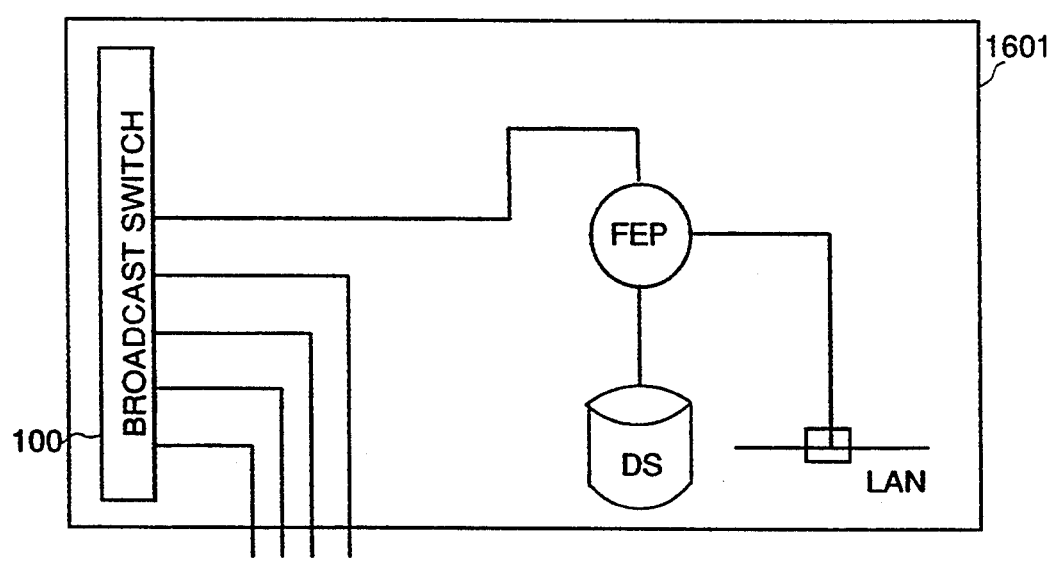
FIG. 22 is a mounting of a front end processor in accordance with this invention.

The parallel processor configured as shown in FIG. 1 uses four of these mounting units 1601 shown in FIG. 16, one mounting unit of FIG. 21 that has input/output clusters 104 and extended storage clusters 105, and an FEP 106 mounting unit of FIG. 22 with the broadcast switch 100 connected thereto.

This mounting makes possible distributed mounting of the crossbar switches 100, 101 that are the structural elements of the network. Accordingly, the interfaces between the crossbar switch groups and cluster groups (each mounting unit being a group) do not become concentrated in one place. Also, compared to configurations in which crossbar switches and cluster groups are separated and centralized mounting is used for each, in the connecting interfaces between exchangers and crossbar switches it is possible to reduce the number of connecting interfaces between mounting units. If for example the mounting unit 1601 was a frame it would be possible to reduce the number of cables between frames. With respect also to increasing the number of clusters, increasing the number of ports for crossbar switches 101 beforehand makes it possible to implement such expansion with the mounting units 1601. Furthermore, compared to interfaces between mounting units, in this case the interfaces between clusters and crossbar switches are enclosed in the mounting units 1601, thereby shortening the interfaces and making it possible to transfer data between clusters on one mounting unit 1601 at higher speeds, particularly when the mounting unit 1601 is a single chip IC. If this localized high-speed intra-mounting data transfer is taken into consideration, the overall parallel processing performance can be improved by using parallel processing cluster assignments and the like, e.g., where one parallel processing requiring more than one computing cluster is assigned to only computing clusters of the same mounting.

For higher speeds it is possible to implement synchronous data transfer operations on the connecting interfaces between exchangers, cluster and crossbar switches. However, with synchronous transfers, design considerations must be given to the interface delay when using the maximum number of system clusters, and it is also necessary to align the clock skew each time the number of clusters is increased. In view of this, it is preferable to use asynchronous data transfers for the connecting interfaces of processors and crossbar switches. In this embodiment, therefore, as mentioned above, FIFOs are provided and asynchronous data transfer implemented between clusters and exchangers, and between exchangers and crossbar switches.

Figure 17:
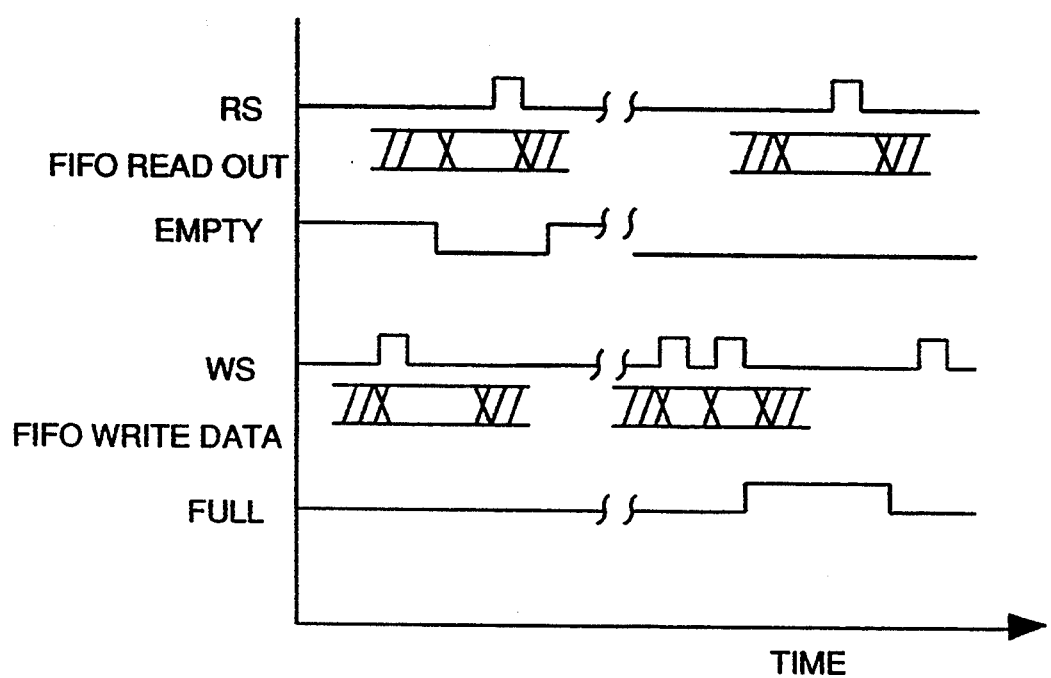
FIG. 17 is a time chart of the FIFO according to this invention.

As shown in FIG. 17, for FIFO write operations, it is confirmed that the Full signal output by a FIFO is 0, and then a write strobe WS and the FIFO data are transmitted, and the data is written into the FIFO. When a FIFO is full and unable to accept any more data, the Full signal is 1; at other times it is 0. When the Full signal is 1, the write operation is inhibited until the Full signal goes to 0, that is, until a read operation takes place. In read operations, it is confirmed that the Empty signal output by the FIFO is 0, a read strobe RS is sent and the messages, FiFo READ OUT, held in the FIFO are read out. When the FIFO contains no data the Empty signal is 1; at other times it is 0. When the Empty signal is 1 the read operation is inhibited until the Empty signal goes to 0, that is. until a write operation takes place. These write and read operations can be performed asynchronously if the above operations are observed.

If asynchronous data exchange is employed, operations between clusters, exchangers and crossbar switches can be implemented independently. Accordingly, if for example an error has been produced by an exchanger and to analysis this error a service processor (hereinafter referred to as SVP and a part of the FEP, e.g.) is being used to scan out the registers and suchlike of the exchanger, the crossbar switches and cluster connected to the exchanger being scanned can continue normally without any need to know about the scan-out operation or be shut down because of it. Asynchronous transfer is used for FIFO write operations involved in data transfers from the crossbar switches and clusters to the exchangers, as this enables the Full and Empty signals output by a FIFO to be used to inhibit operations. Thus implementing asynchronous transfer interface between the exchangers, clusters and crossbar switches enables these system units to be independently maintained on an individual basis.

Figure 18:
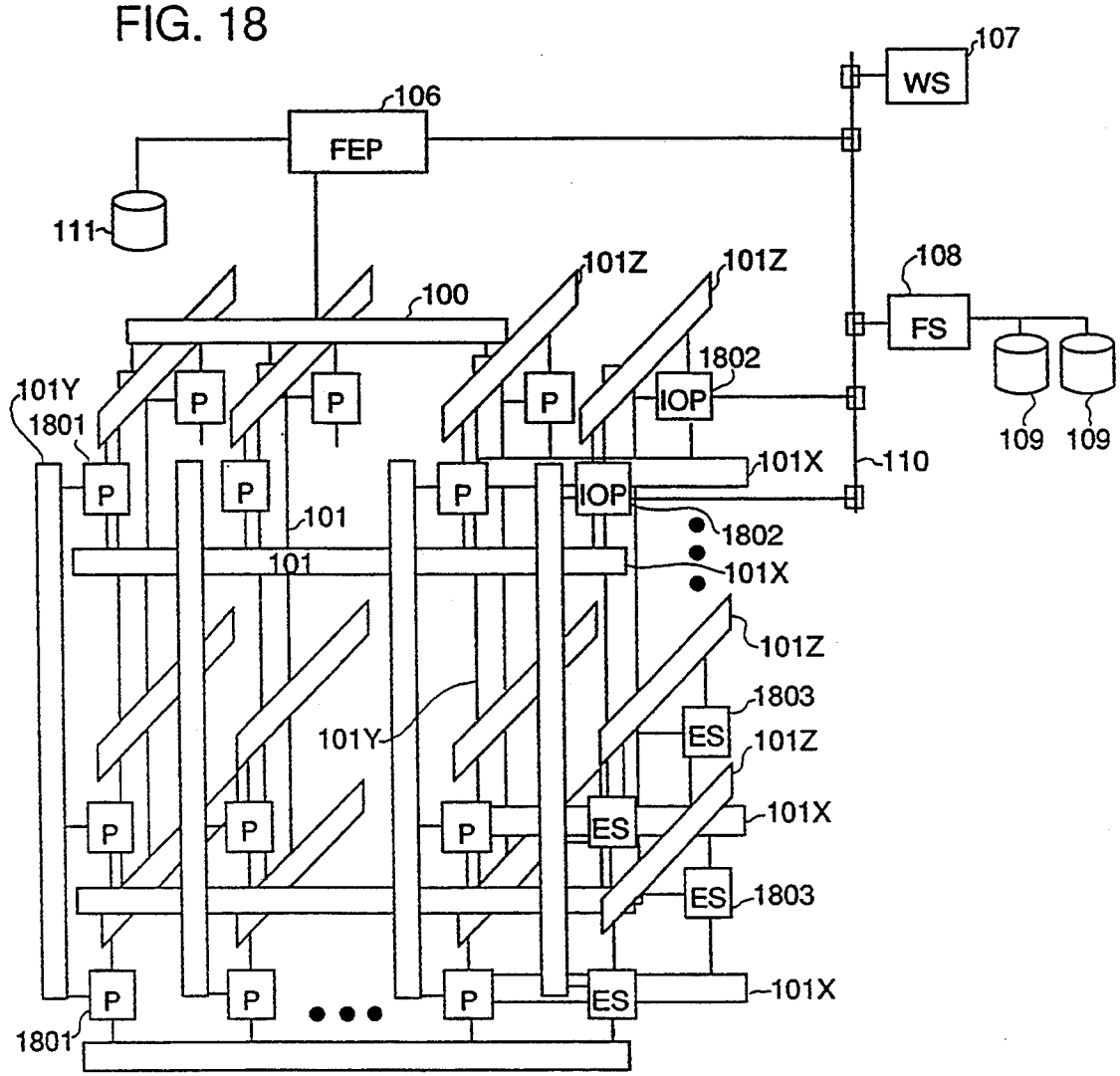
FIG. 18 is a system configuration image diagram showing a parallel processor with a three-dimensional arrangement in accordance with this invention.

The foregoing description has been with reference to a two-dimensional array of 16 computing clusters arranged in two dimensions. However, it is possible to implement the same concept without limiting the number of computing clusters, and the number of dimensions thereof. FIG. 18 shows an image of a three-dimensional parallel processor system configuration/arrangement. Here, exchanger 102 and computing cluster 103 are shown combined as a block P, 1801, exchanger 102 and input/output cluster 104 are shown combined as block IOP, 1802, and exchanger 102 and extended storage cluster 105 are shown combined as block ES, 1803. Thus a detailed explanation of 1801, 1803 and 1802 has already been given.

Figure 19:
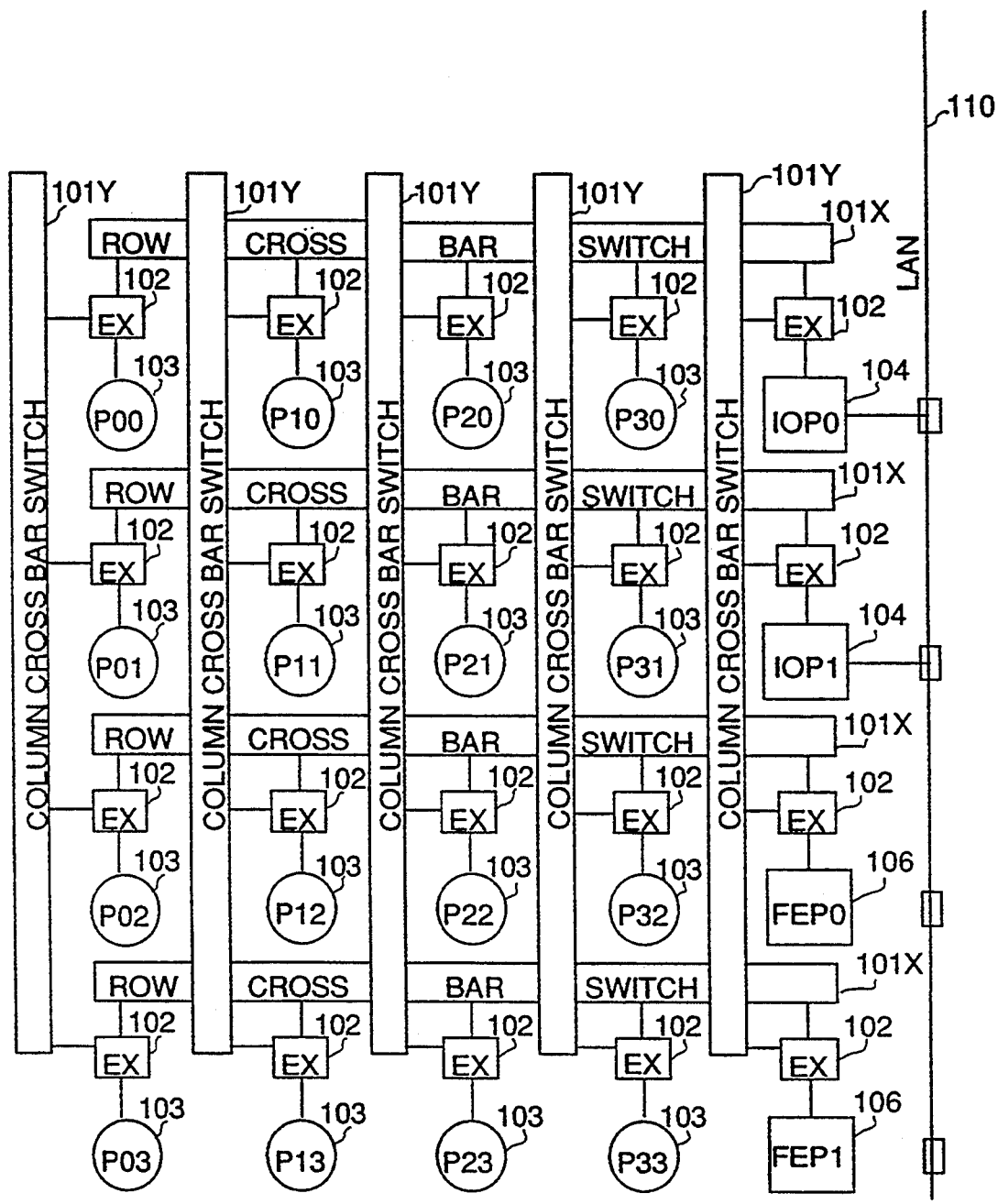
FIG. 19 is a system configuration image diagram showing a parallel processor with a two-dimensional arrangement connected to a plurality of front end processors in accordance with this invention.

Instead of providing a broadcast crossbar switch 100 for connecting the FEP 106 according to FIG. 1, as shown in FIG. 19 a configuration may be used that has a plurality of FEPs 106 in place of the extended storage clusters 105 in FIG. 1. In cases where the load on the FEP 106 is too heavy to be processed by one FEP unit, this is an effective configuration for connecting a plurality of FEPs 106 to distribute the load.

Furthermore, in the above embodiment the X direction crossbar switches 101x, Y direction crossbar switches 101y, and the broadcast crossbar switch 100 connected to the front-end processor 106 are all assumed to have the same structure. Therefore, they have all been given the same number of ports. However, this invention is not thus limited; a different number of clusters may be connected to the X direction crossbar switches and the Y direction crossbar switches, therefore the number of their ports also may be different. Also, it is only necessary for the crossbar network to have the minimum functions needed to perform transfers from the front-end processor to all or each of the clusters, and transfers from each cluster to the front-end processor.

In accordance with this invention it is possible to provide a crossbar switch having $2^n+1$ ports (where n is a positive integer), arrange a group of computing clusters so that the crossbar switch has $2^n$ computing clusters, and locate an auxiliary processor that performs parallel processing administrative functions such as input/output functions at the remaining port of the crossbar switch, thereby eliminating the need to provide each computing cluster with additional ports and additional crossbar switches for linking the auxiliary processor and enabling the scale of the parallel processor system mounting to be reduced. Moreover, the parallel processor system can be formed with $2^n$ computing clusters without reducing the number of processors that execute the parallel processing and parallel processing can be extended independently of the parallel processing administrative functions and input/output functions.

With this invention, also, one mounting unit is formed of one crossbar switch of one dimension and the processor group connected to that crossbar switch, and all of the crossbar switches of a different dimension to the one mentioned above that are connected to one of the processors of the processor group. Therefore the parallel processor system can be mounted by just combining mounting units with no need for special LSIs or frames or the like on which to mount the crossbar switches. This enables the mounting to be done without processor and network connecting interfaces becoming concentrated in one place.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A parallel processor system, comprising:
    a plural number, $2^n \times 2^n$, of computing clusters that each execute instructions of a program in parallel for parallel processing, said computing cluster being configured in an n dimensional array of $2^n$ rows by $2^n$ columns where n is an integer equal to 2 or greater than 2;
    a plurality of supporting auxiliary processors separate from said computing clusters, each of said auxiliary processors performing administrative and input/output functions for the parallel processing of said computing clusters;
    a network of n partial networks, each partial network having input/output ports with each input/output port being able to transfer messages;
    said network further including multiple exchangers, each exchanger being connected to respective one of the input/output ports in each said partial network, and each exchanger being connected to a respective one of the computing clusters and said auxiliary processors, for connecting said auxiliary processors with said computing clusters and for connecting said computing cluster to each other;
    each of the partial networks having $2^n+1$ crossbar switches, with each crossbar switch having a set of $2^n+1$ of the input/output ports;
    the computing clusters being respectively connected to the exchangers that are respectively connected to the $2^n$ of the $2^n+1$ input/output ports included in each of the partial networks; and
    the auxiliary processors being respectively connected to the exchangers that are respectively connected to the 1 of the $2^n+1$ input/output ports included in each of the partial networks.

2. The parallel processor system according to claim 1, in which the auxiliary processors include multiple input/output processors.

3. The parallel processor system according to claim 1, in which the auxiliary processors include multiple extended storage processors each of which have extended storage for the computing clusters.

4. The parallel processor system according to claim 1, in which the auxiliary processors include multiple input/output processors and a front-end processor to control the administrative functions of the computing clusters.

5. The parallel processor system according to claim 1, in which the auxiliary processors include multiple extended storage processors each of which have extended storage for the computing clusters; and
    in which the auxiliary processors include multiple input/output processors and a front-end processor to control the administrative functions of the computing clusters.

6. The parallel processor system according to claim 1 wherein said auxiliary processors further include at least one front-end processor connected to $2^n$ of the input/output ports of one of the partial networks.

7. A parallel processor system according to claim 6, in which the auxiliary processors include multiple input/output processors; and
    in which the auxiliary processors include multiple extended storage processors each of which have extended storage for the computing clusters.

8. A parallel processing system, comprised of multiple computing clusters that each execute instructions of a program in parallel for parallel processing, multiple auxiliary processors separate from said computing clusters, each of said auxiliary processors performing administrative and input/output functions for the parallel processing of said computing clusters for supporting said computing clusters, and a network that connects the computing clusters and the auxiliary processors; wherein:
    the network is provided with
    $2^i$ (where i is a positive integer) crossbar switches of a first type, each of which is arranged in association with one of a group of $2^i$ coordinate points on a first coordinate axis and each of which has $2^j+1$ (where j is a positive integer that may be smaller than, equal to or greater than 1) input/output ports, and
    $2^j+1$ crossbar switches of a second type, each of which is arranged in association with one of a group of $2^j+1$ coordinate points on a second coordinate axis and each having at least $2^i$ input/output ports;
    a multiplicity greater than $2^i \times 2^j$ of exchangers, each of which is arranged in association with a unique combination of one of the coordinate points on the first coordinate axis and one of the coordinate points on the second coordinate axis;
    each of said exchangers is connected to one of the input/output ports in one of the crossbar switches of the first type corresponding to one of the coordinate points on the first coordinate axis, and is connected to one of the input/output ports in one of the crossbar switches of the second type corresponding to one of the coordinate points on the second coordinate axis to transmit messages therebetween; and
    each of the auxiliary processors and each of the computing clusters is connected to a corresponding one of the exchangers.

9. A parallel processing system according to claim 8, further including:
    each of said crossbar switches of the second type having an additional input/output port;
    a front end processor; and
    a broadcast crossbar switch in addition to said crossbar switches of a first type and in addition to said crossbar switches of a second type, said broadcast crossbar switch being connected to said front end processor for exchanging messages therewith, and said broadcast crossbar switch having a plurality of at least $2^j$ input/output ports respectively connected to said additional input/output port of a corresponding one of said crossbar switches of the second type.

10. A parallel processing system according to claim 8, wherein there are $2^i \times (2^j+1)$ exchangers.

11. A parallel processing system according to claim 9, wherein said broadcast crossbar switch input/output ports are not connected to said crossbar switches of the first type.

12. A parallel processing system according to claim 9, wherein $2^j$ of said crossbar switches of said second type each have an additional input/output port: said broadcast crossbar switch input/output ports are connected only to the front end processor and the additional input/output ports of the $2^j$ of said crossbar switches of said second type; and the $2^j$ of said crossbar switches of said second type are connected to $2^j$ of said exchangers that are connected to said computing clusters.

13. A parallel processing system according to claim 12, wherein there are $2^i \times (2^j + 1)$ of said exchangers.

14. A parallel processing system having a partial crossbar switch network, comprising:
p crossbar switches in one dimension of an array and having q input/output ports, wherein p and q are integers that may or may not be equal;
q crossbar switches in another dimension of the array having p input/output ports;
p times q exchangers that are each connected to a respective one of the p input/output ports and a respective one of the q input/output ports to transfer messages therewith;
p times q computing clusters, each said computing clusters executing a program instruction with data in parallel for parallel processing and each said computing clusters is connected to a corresponding one of said exchangers to exchange messages therewith;
multiple mounting units;
each mounting unit having one of the p crossbar switches, one of the q crossbar switches, and all of the exchangers and computing clusters connected to the one p crossbar switch.

15. A parallel processing system according to claim 14, wherein both p and q are $2^i$ (where i is a positive integer equal to a number of the dimensions).

16. A parallel processing system according to claim 14, further comprising:
each of the p crossbar switches having one auxiliary port in addition to said input/output ports;
an auxiliary crossbar switch in addition to said p crossbar switches and said q crossbar switches, and said auxiliary crossbar switch having auxiliary ports;
a plurality of auxiliary exchangers, each connected to a respective one of the auxiliary ports on one of the p crossbar switches and connected to one of the auxiliary ports on the auxiliary crossbar switch to transfer messages therebetween;
a plurality of auxiliary processors separate from said computing clusters, each of said auxiliary processors performs administrative and input/output functions for the parallel processing of said computing clusters, and each of said auxiliary processors being connected to a corresponding auxiliary exchanger to transfer messages therebetween; and
an additional mounting unit carrying said auxiliary exchangers, auxiliary processors and auxiliary crossbar switch.

17. A parallel processor system according to claim 16, wherein both p and q are $2^i$ (where i is a positive integer equal to a number of the dimensions).

18. A parallel processor system comprised of multiple computing clusters that each execute instructions of a parallel processing program, at least one front-end processor to control the computing clusters and a network that connects the computing clusters, the network including:
multiple groups of processor network elements having input/output ports able to transfer messages;
exchangers that each connect to one of said input/output ports in each of the multiple groups of processor network elements;
the multiple computing clusters being respectively connected to the multiple exchangers; and
one broadcast network element having input/output ports, each of said input/output ports is connected to one corresponding input/output port of the processor network elements of only one of the multiple groups of processor network elements and further having one input/output port connected to the front-end processor.

19. A parallel processor according to claim 18 in which crossbar switches constitute each of the processor network elements.

20. A parallel processing system having a partial crossbar switch network, comprising:
p crossbar switches in one dimension and having q input/output ports wherein p and q are integers that may or may not be equal;
q crossbar switches in another dimension having p input/output ports;
p times q exchangers that are each connected to a respective one of the p input/output ports and a respective one of the q input/output ports to transfer messages therewith;
p times q computing clusters, each executing a program instruction with data in parallel for parallel processing and each connected to a corresponding one of said exchangers to exchange messages therewith;
each of the p crossbar switches having one auxiliary port in addition to said input/output ports;
an auxiliary crossbar switch in addition to said p crossbar switches and said q crossbar switches, wherein the auxiliary crossbar switch has auxiliary ports;
a plurality of auxiliary exchangers, each connected to a respective one of the auxiliary ports on one of the p crossbar switches and connected to one of the auxiliary ports on the auxiliary crossbar switch to transfer messages therebetween;
a plurality of auxiliary processors separate from said computing clusters, each of said auxiliary processors performs administrative and input/output functions for the parallel processing of said computing clusters, and each of said auxiliary processors being connected to a corresponding auxiliary exchanger to transfer messages therebetween; and
wherein both p and q are $2^i$ (where i is a positive integer equal to a number of the dimensions).

21. A parallel processor according to claim 20, further comprising:
a front end processor;
one broadcast crossbar switch, in addition to said p, q and auxiliary crossbar switches;
each of said q crossbar switches having a broadcast input/output port in addition to said p input/output ports;
said broadcast crossbar switch having q input/output ports, each connected to a corresponding one of the input/output broadcast ports; and
said front end processor being connected to said broadcast crossbar switch.

* * * * *

UNITED STATES PATENT AND TRADEMARK OFFICE
CERTIFICATE OF CORRECTION

PATENT NO. : 5,677,333
DATED : October 14, 1997
INVENTOR(S) : Daniel Louis Loughner et al.

Page 1 of 2

It is certified that error appears in the above-identified patent and that said Letters Patent is hereby corrected as shown below:

Col. 2, lines 12-13: change
"N-[3'(1'-chloro-3'-methyl-2'-oxopentan]-3,5-dichloro-4-methylbenzamide" to
-- N-[3'-(1'-chloro-3'-methyl-2'-oxopentan]-3,5-dichloro-4-methylbenzamide--

Col. 2, lines 28-29: change
"N-[3'(1'-chloro-3'-methyl-2'-oxopentan]-3,5-dichloro-4-methylbenzamide" to
-- N-[3'-(1'-chloro-3'-methyl-2'-oxopentan]-3,5-dichloro-4-methylbenzamide--

Col. 8, Table 3, line 6: The second title "Phytophthora infestans, Potatoes, Maine, U.S.A." should be deleted.

Col. 11, claim 1, line 35: change "provide" to --provided--
Col. 11, claim 1, lines 35-36: change
"N-[3'(1'-chloro-3-methyl-2'-oxopentan]-3,5-dichlor-4-methylbenzamide" to
--N-[3'-(1'-chloro-3'-methyl-2'-oxopentan]-3,5-dichloro-4-methylbenzamide--

Col. 11, claim 2, lines 42-43: change
"N-[3'(1'-chloro-3-methyl-2'-oxopentan]-3,5-dichlor-4-methylbenzamide" to
--N-[3'-(1'-chloro-3'-methyl-2'-oxopentan]-3,5-dichloro-4-methylbenzamide--

Col. 12, claim 4, line 21: change "claim 12" to --claim 1--

Col. 12, claim 5, lines 28-29: change
"N-[3'(1'-chloro-3-methyl-2'-oxopetan]-3,5-dichlor-4-methylbenzamide" to
--N-[3'-(1'-chloro-3'-methyl-2'-oxopentan]-3,5-dichloro-4-methylbenzamide--

UNITED STATES PATENT AND TRADEMARK OFFICE
CERTIFICATE OF CORRECTION

PATENT NO. : 5,677,333

DATED : October 14, 1997

INVENTOR(S) : Daniel Louis Loughner et al.

It is certified that error appears in the above-identified patent and that said Letters Patent is hereby corrected as shown below:

```
Col. 12, claim 10, lines 42-43: change
"N-[3'(1'-chloro-3-methyl-2'-oxopentan]-3,5-dichlor-4-methylbenzamide" to
--N-[3'-(1'-chloro-3'-methyl-2'-oxopentan]-3,5-dichloro-4-methylbenzamide--
```

Signed and Sealed this

Third Day of November, 1998

Attest:

BRUCE LEHMAN

Attesting Officer

Commissioner of Patents and Trademarks